United States Patent
Patten et al.

(10) Patent No.: US 9,947,434 B2
(45) Date of Patent: Apr. 17, 2018

(54) TETHERS FOR AIRBORNE WIND TURBINES USING ELECTRICAL CONDUCTOR BUNDLES

(71) Applicant: X Development LLC, Mountain View, CA (US)

(72) Inventors: Elias Wolfgang Patten, Seattle, WA (US); Damon Vander Lind, Alameda, CA (US)

(73) Assignee: X Development LLC, Mountain View, CA (US)

( * ) Notice: Subject to any disclaimer, the term of this patent is extended or adjusted under 35 U.S.C. 154(b) by 47 days.

(21) Appl. No.: 15/006,104

(22) Filed: Jan. 25, 2016

(65) Prior Publication Data

US 2017/0213617 A1    Jul. 27, 2017

(51) Int. Cl.
| | |
|---|---|
| *H01B 7/00* | (2006.01) |
| *D07B 1/14* | (2006.01) |
| *H01B 7/04* | (2006.01) |
| *F03D 13/20* | (2016.01) |
| *F03D 80/80* | (2016.01) |

(52) U.S. Cl.
CPC .......... *H01B 7/0045* (2013.01); *D07B 1/147* (2013.01); *F03D 13/20* (2016.05); *H01B 7/043* (2013.01); *F03D 80/85* (2016.05); *F05B 2240/917* (2013.01); *F05B 2240/921* (2013.01)

(58) Field of Classification Search
CPC .. H01B 7/0045; H01B 7/0208; H01B 7/0216; H01B 7/0225; H01B 9/04
See application file for complete search history.

(56) References Cited

U.S. PATENT DOCUMENTS

| | | |
|---|---|---|
| 2,589,507 A | 3/1952 | Noyes |
| 2,953,627 A | 9/1960 | Malneritch et al. |
| 3,261,907 A | 7/1966 | Morrison |
| 3,602,632 A | 8/1971 | Ollis |
| 3,684,821 A | 8/1972 | Miyauchi et al. |
| 3,784,732 A | 1/1974 | Whitfill, Jr. |

(Continued)

FOREIGN PATENT DOCUMENTS

| | | |
|---|---|---|
| CN | 101644805 | 2/2010 |
| WO | WO 2012/012429 | 1/2012 |

(Continued)

OTHER PUBLICATIONS

International Search Report prepared by the U.S. Patent Office in international patent application serial No. PCT/US2011/044539 dated Nov. 25, 2011.

(Continued)

*Primary Examiner* — Timothy Thompson
*Assistant Examiner* — Amol Patel
(74) *Attorney, Agent, or Firm* — McDonnell Boehnen Hulbert & Berghoff LLP

(57) ABSTRACT

A tether may include a core, a hybrid layer surrounding the core, and a jacket surrounding the hybrid layer. The hybrid layer may include a plurality of strength members, and a plurality of electrical conductor bundles. Each electrical conductor bundle of the plurality of electrical bundles may include a compliant element, a plurality of electrical conducting elements surrounding the compliant element, and an insulating layer surrounding the plurality of electrical conducting elements.

20 Claims, 10 Drawing Sheets

(56) References Cited

U.S. PATENT DOCUMENTS

| | | | |
|---|---|---|---|
| 4,110,554 A * | 8/1978 | Moore | D07B 1/147 |
| | | | 174/101.5 |
| 4,196,307 A | 4/1980 | Moore et al. | |
| 4,251,040 A | 2/1981 | Loyd | |
| 4,317,000 A | 2/1982 | Ferer | |
| 4,365,865 A | 12/1982 | Stiles | |
| 4,440,974 A | 4/1984 | Naudet | |
| 4,486,669 A | 12/1984 | Pugh | |
| 4,646,428 A * | 3/1987 | Marancik | H01L 39/2409 |
| | | | 148/536 |
| 4,659,940 A | 4/1987 | Shepard | |
| 4,696,542 A | 9/1987 | Thompson | |
| 4,842,221 A | 6/1989 | Beach et al. | |
| 5,202,944 A | 4/1993 | Riordan | |
| 5,274,725 A | 12/1993 | Bottoms, Jr. et al. | |
| 5,495,547 A | 2/1996 | Rafie et al. | |
| 5,813,106 A | 9/1998 | Haug et al. | |
| 5,902,958 A | 5/1999 | Haxton | |
| 6,072,245 A | 6/2000 | Ockels | |
| 6,102,077 A | 8/2000 | Legallais et al. | |
| 6,297,455 B1 | 10/2001 | Wijnberg et al. | |
| 6,325,330 B1 | 12/2001 | Lavan, Jr. | |
| 6,392,151 B1 | 5/2002 | Rafie et al. | |
| 6,600,108 B1 | 7/2003 | Mydur et al. | |
| 6,781,254 B2 | 8/2004 | Roberts | |
| 6,859,590 B1 | 2/2005 | Zaccone et al. | |
| 7,462,781 B2 | 12/2008 | Varkey et al. | |
| 7,752,830 B2 | 7/2010 | Goldwater et al. | |
| 8,350,403 B2 | 1/2013 | Carroll | |
| 8,907,516 B2 | 12/2014 | Carroll | |
| 8,921,698 B2 | 12/2014 | Vander Lind et al. | |
| 8,957,312 B2 | 2/2015 | McCullough et al. | |
| 9,230,714 B2 | 1/2016 | Vander Lind et al. | |
| 2004/0089468 A1 | 5/2004 | Carstensen et al. | |
| 2005/0199415 A1 | 9/2005 | Glew | |
| 2007/0209825 A1 | 9/2007 | Glew | |
| 2009/0289148 A1 | 11/2009 | Griffith et al. | |
| 2010/0026007 A1 | 2/2010 | Bevirt | |
| 2010/0032947 A1 | 2/2010 | Bevirt | |
| 2010/0032948 A1 | 2/2010 | Bevirt | |
| 2010/0221112 A1 | 9/2010 | Bevirt | |
| 2010/0230546 A1 | 9/2010 | Bevirt | |
| 2010/0283253 A1 | 11/2010 | Bevirt | |
| 2010/0295320 A1 | 11/2010 | Bevirt | |
| 2010/0295321 A1 | 11/2010 | Bevirt et al. | |
| 2011/0042508 A1 | 2/2011 | Bevirt et al. | |
| 2011/0042509 A1 | 2/2011 | Bevirt et al. | |
| 2011/0042510 A1 | 2/2011 | Bevirt et al. | |
| 2011/0121570 A1 | 5/2011 | Bevirt et al. | |
| 2011/0127775 A1 | 6/2011 | Bevirt | |
| 2011/0266395 A1 | 11/2011 | Bevirt | |
| 2012/0070122 A1 * | 3/2012 | Lind | F03D 5/00 |
| | | | 385/103 |
| 2012/0168199 A1 * | 7/2012 | McCullough | H01B 7/14 |
| | | | 174/113 R |
| 2012/0286102 A1 | 11/2012 | Sinha et al. | |
| 2012/0287274 A1 | 11/2012 | Bevirt | |
| 2014/0262428 A1 | 9/2014 | Broughton, Jr. et al. | |
| 2015/0041598 A1 | 2/2015 | Nugent et al. | |
| 2015/0110451 A1 | 4/2015 | Blazer et al. | |
| 2016/0056621 A1 | 2/2016 | Patten et al. | |

FOREIGN PATENT DOCUMENTS

| | | |
|---|---|---|
| WO | WO 2012/013659 | 2/2012 |
| WO | WO2013052178 | 4/2013 |

OTHER PUBLICATIONS

Supplementary European Search Report prepared by the European Patent Office in Application No. EP 11 810283.9, dated Sep. 1, 2015.

Han et al., Overview of Semiconductive Shield Technology in Power Distribution Cables, Transmission and Distribution Conference and Exhibition, 2005/2006 IEEE PES, May 2006.

"Neutral Tethers," South Bay Cable Corporation, [Retrieved Mar. 14, 2016] from Internet http://www.southbaycable.com/products1.html.

"Armored Umbilicals," South Bay Cable Corporation, [Retrieved Mar. 14, 2016] from Internet http://www.southbaycable.com/products2.html.

"Tow Cables," South Bay Cable Corporation, [Retrieved Mar. 14, 2016] from Internet http://www.southbaycable.com/products3.html.

International Search Report and Written Opinion prepared by the European Patent Office in International Application No. PCT/US2016/068739, dated May 16, 2017.

* cited by examiner

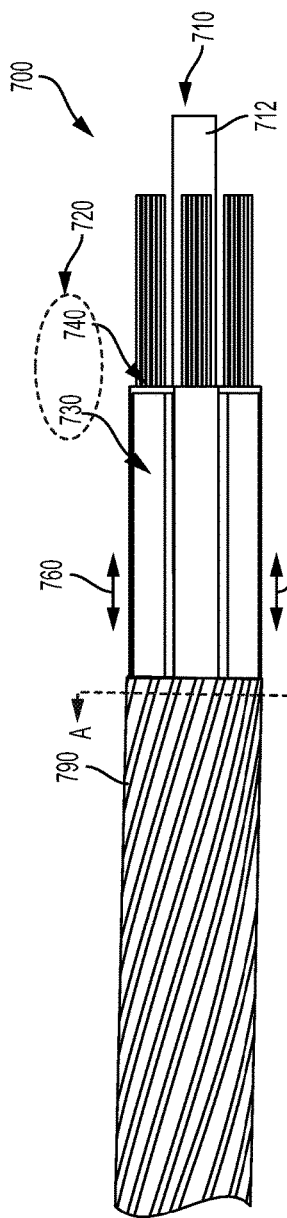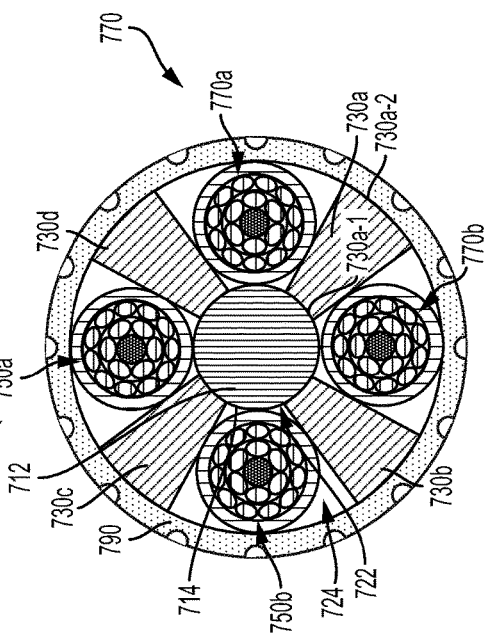
FIG. 7a
FIG. 7b
A-A VIEW

TETHERS FOR AIRBORNE WIND TURBINES USING ELECTRICAL CONDUCTOR BUNDLES

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Tethers are described herein. Beneficially, embodiments described herein may reduce a weight of the tether and/or reduce a size of the tether. Further, embodiments described herein may improve the flexibility of the tether, improve the transverse stiffness of the tether, and/or improve torque transmission of the tether.

In one aspect, a tether may comprise: a core; a hybrid layer surrounding the core, wherein the hybrid layer comprises: a plurality of strength members, and a plurality of electrical conductor bundles, wherein each electrical conductor bundle of the plurality of electrical bundles comprises: a compliant element, a plurality of electrical conducting elements surrounding the compliant element, and an insulating layer surrounding the plurality of electrical conducting elements; and a jacket surrounding the hybrid layer.

In another aspect, a tether may comprise: a core; a hybrid layer surrounding the core, wherein the hybrid layer comprises: a first strength member, a second strength member, and a plurality of electrical conductor bundles, wherein each electrical conductor bundle of the plurality of electrical conductor bundles comprises: a compliant element, a plurality of electrical conducting elements wound around the compliant element, and an insulating layer surrounding the plurality of electrical conducting elements, wherein the plurality of electrical conductor bundles comprises: a first group of electrical conductor bundles defining a first electrical path, wherein the first group of electrical conductor bundles is located around a first portion of the core, such that a cross-section of the first group of electrical conductor bundles defines a first arc along the first portion of the core, and a second group of electrical conductor bundles defining a second electrical path that is different than the first electrical path, wherein the second group of electrical conductor bundles is located around a second portion of the core, such that a cross-section of the second group of the electrical conductor bundles defines a second arc along the second portion of the core, wherein the first group of electrical conductor bundles is located between the first strength member and the second strength member, and wherein the second group of electrical conductor bundles is located between the first strength member and the second strength member; and a jacket surrounding the hybrid layer.

In another aspect, a tether may comprise: a core; a hybrid layer surrounding the core, wherein the hybrid layer comprises: a plurality of strength members, wherein each strength member of the plurality of strength members comprises a non-circular cross-section shape; a plurality of electrical conductor bundles, wherein each electrical conductor bundle of the plurality of electrical conductor bundles comprises a circular cross-section shape, wherein each electrical conductor bundle of the plurality of electrical conductor bundles comprises: a compliant element, a plurality of electrical conducting elements wound around the compliant element, and an insulating layer surrounding the plurality of electrical conducting elements, wherein the plurality of electrical conductor bundles comprises: a first group of electrical conductor bundles defining a first electrical path, wherein the first group of electrical conductor bundles is located around a first half of a circumference of the core, and a second group of electrical conductor bundles defining a second electrical path that is different than the first electrical path, wherein the second group of electrical conductor bundles is located around a second half of a circumference of the core, and wherein each electrical conductor bundle of the plurality of electrical conductor bundles is located between two strength members of the plurality of strength members; and a jacket surrounding the hybrid layer.

In another aspect, a tether may comprise: a core; a hybrid layer surrounding the core, wherein the hybrid layer comprises: a plurality of first strength members located around the core, wherein each first strength member of the plurality of first strength members comprises a rectangular cross-section shape, a plurality of second strength members located around the plurality of first strength members, wherein each second strength member of the plurality second strength members comprises a triangular cross-section shape, and a plurality of electrical conductor bundles located around the core, wherein each electrical conductor bundle of the plurality of electrical conductor bundles comprises a circular cross-section shape, wherein each electrical conductor bundle of the plurality of electrical conductor bundles comprises: a compliant element, a plurality of electrical conducting elements wound around the compliant element, and an insulating layer surrounding the plurality of electrical conducting elements, wherein the plurality of electrical conductor bundles comprises: a first group of electrical conductor bundles defining a first electrical path, wherein the first group of electrical conductor bundles is located around a first half of a circumference of the core, and a second group of electrical conductor bundles defining a second electrical path that is different than the first electrical path, wherein the second group of electrical conductor bundles is located around a second half of a circumference of the core, and wherein each electrical conductor bundle of the plurality of electrical conductor bundles is located between two first strength members of the plurality of first strength members and two second strength members of the plurality of second strength members; and a jacket surrounding the plurality of second strength members and the plurality of electrical conductor bundles.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 5b-1 depicts an electrical conductor bundle shown in FIG. 5b, according to an example embodiment.

FIG. 7a depicts a tether, according to an example embodiment.

FIG. 7b depicts the tether shown in FIG. 7a in cross-section, according to an example embodiment.

DETAILED DESCRIPTION

Figure 1:
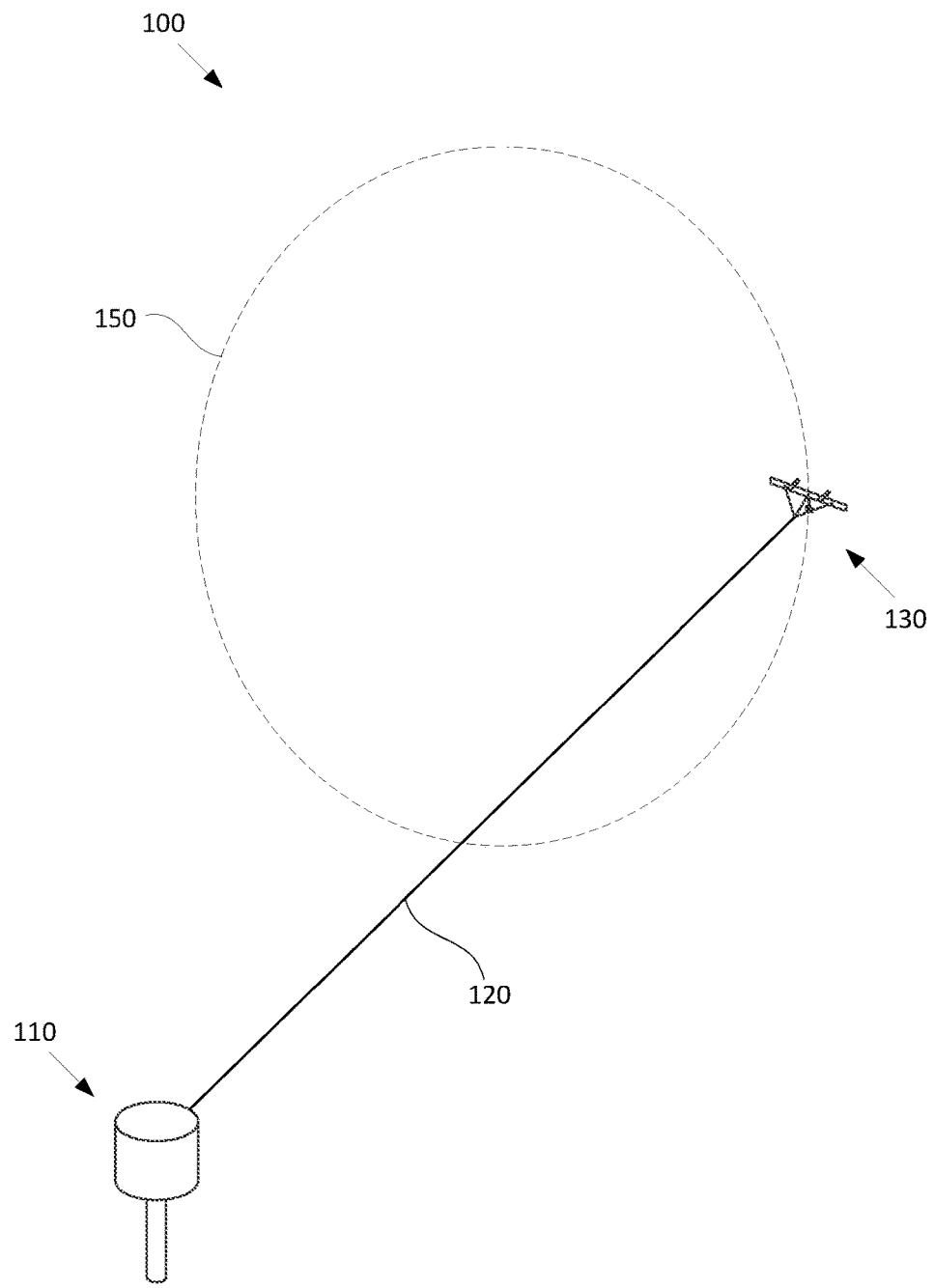
FIG. 1 depicts an Airborne Wind Turbine (AWT), according to an example embodiment.

Exemplary systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems can be arranged and combined in a wide variety of different configurations, all of which are contemplated herein.

I. Overview

Illustrative embodiments relate to aerial vehicles, which may be used in a wind energy system, such as an Airborne Wind Turbine (AWT). In particular, illustrative embodiments may relate to or take the form of tethers that may be used in AWTs.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some implementations, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters, the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented, such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

Embodiments described herein relate to or take the form of tethers. Tethers described herein may be configured to withstand one or more forces when the aerial vehicle is in flight (e.g., tension from aerodynamic forces acting on the aerial vehicle), and configured to transmit electricity between the aerial vehicle and the ground station.

In an illustrative implementation, a tether may include a core, a hybrid layer surrounding the core, and a jacket surrounding the hybrid layer. The hybrid layer may include a plurality of strength members and a plurality of electrical conductor bundles. Each electrical conductor bundle may include a compliant element, a plurality of electrical conducting elements surrounding the compliant element, and an insulating layer surrounding the plurality of electrical conducting elements.

The hybrid layer may include various different configurations. In some embodiments, the configuration of the hybrid layer may be selected based at least in part on a predetermined loading of the tether and/or a predetermined electrical power transmission of the tether.

For example, the hybrid layer may include various numbers of strength members and electrical conductor bundles in various arrangements. In one implementation, the plurality of strength members may include a first strength member and a second strength member, the plurality of electrical conductor bundles may include a first group of electrical conductor bundles and a second group of electrical conductor bundles, and the first group of electrical conductor bundles may be located between the first strength member and the second strength member, and the second group of electrical conductor bundles may be located between the first strength member and the second strength member. In some embodiments, the first and second groups of electrical conductor bundles may each include three electrical conductor bundles.

In another implementation, the plurality of strength members may include four strength members, and each electrical conductor bundle of the plurality of electrical conductor bundles may be located between two strength members of the plurality of strength members. In some embodiments, the first and second groups of electrical conductor bundles may each include two electrical conductor bundles.

As another example, the strength members and/or the electrical conductor bundles may include various different cross-section shapes. In one implementation, each strength member of the plurality of strength members may have a circular cross-section shape, and each electrical conductor bundle of the plurality of electrical conductor bundles may have a circular cross-section shape. In another implementation, each strength member of the plurality of strength members may have a non-circular cross-section shape, and each electrical conductor bundles of the plurality of electrical conductor bundles may have a circular cross-section shape. Further, in another implementation, each strength member of the plurality of strength members may have a non-circular cross-section shape, and each electrical conductor bundles of the plurality of electrical conductor bundles may have a non-circular cross-section shape.

As another example, the hybrid layer may include multiple groups of strength members. In one implementation, the hybrid layer may include a plurality of first strength members located around the core, a plurality of second strength members located around the plurality of first strength members, and a plurality of electrical conductor bundles located around the core. In some embodiments, first strength members and second strength members may have different cross-section shapes. As another example, the hybrid layer may comprise two or more layers of strength members and/or electrical conductor bundles.

Beneficially embodiments described herein may reduce a weight of the tether and/or reduce a size of the tether, which may improve generation of electrical energy during crosswind flight of the aerial vehicle and/or transmission of electricity to an electrical grid. In addition, embodiments described herein may improve the flexibility of the tether, improve the transverse stiffness of the tether, and/or improve the torque transmission of the tether, which may improve the resistance of the tether to various loads while the AWT is in operation, such as fatigue loads.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150.

B. Illustrative Components of an AWT

Figure 2:
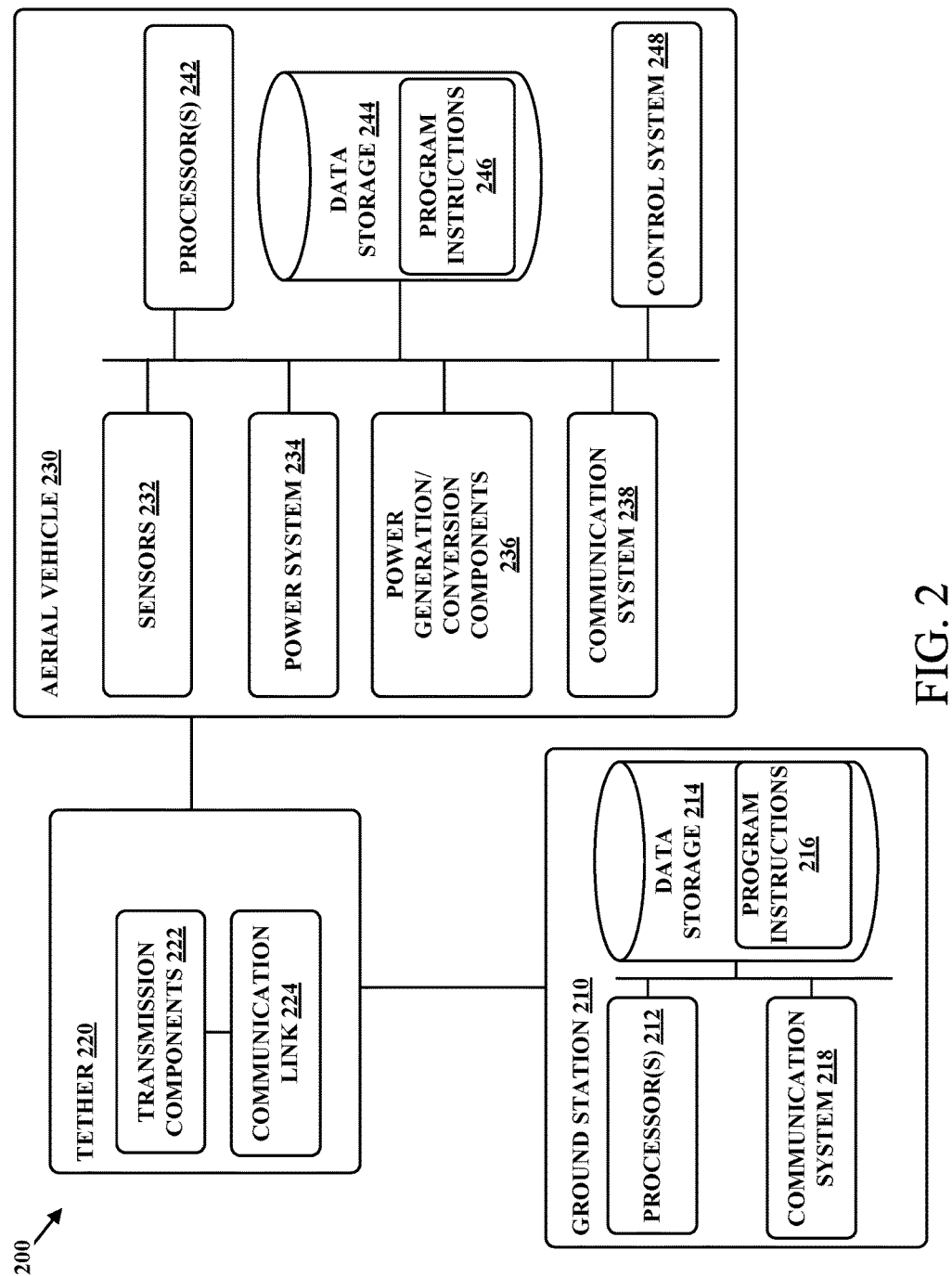
FIG. 2 is a simplified block diagram illustrating components of an AWT, according to an example embodiment.

FIG. 2 is a simplified block diagram illustrating components of the AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more electrical conductors that are configured to transmit electricity. And in at least one such example, the one or more electrical conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able to mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
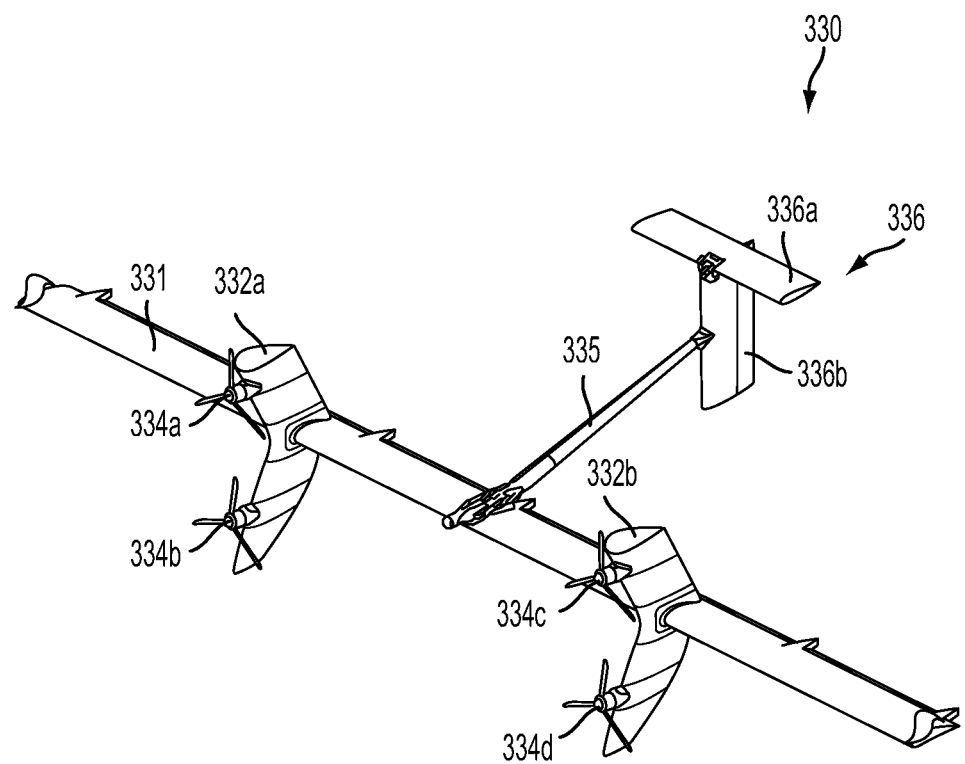
FIG. 3 depicts an aerial vehicle, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 330 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 330.

While the aerial vehicle 330 has been described above, it should be understood that the systems described herein could involve any suitable aerial vehicle that is connected to an airborne wind turbine tether, such as the tether 120 and/or the tether 220.

D. Aerial Vehicle Coupled to a Ground Station Via a Tether

Figure 4:
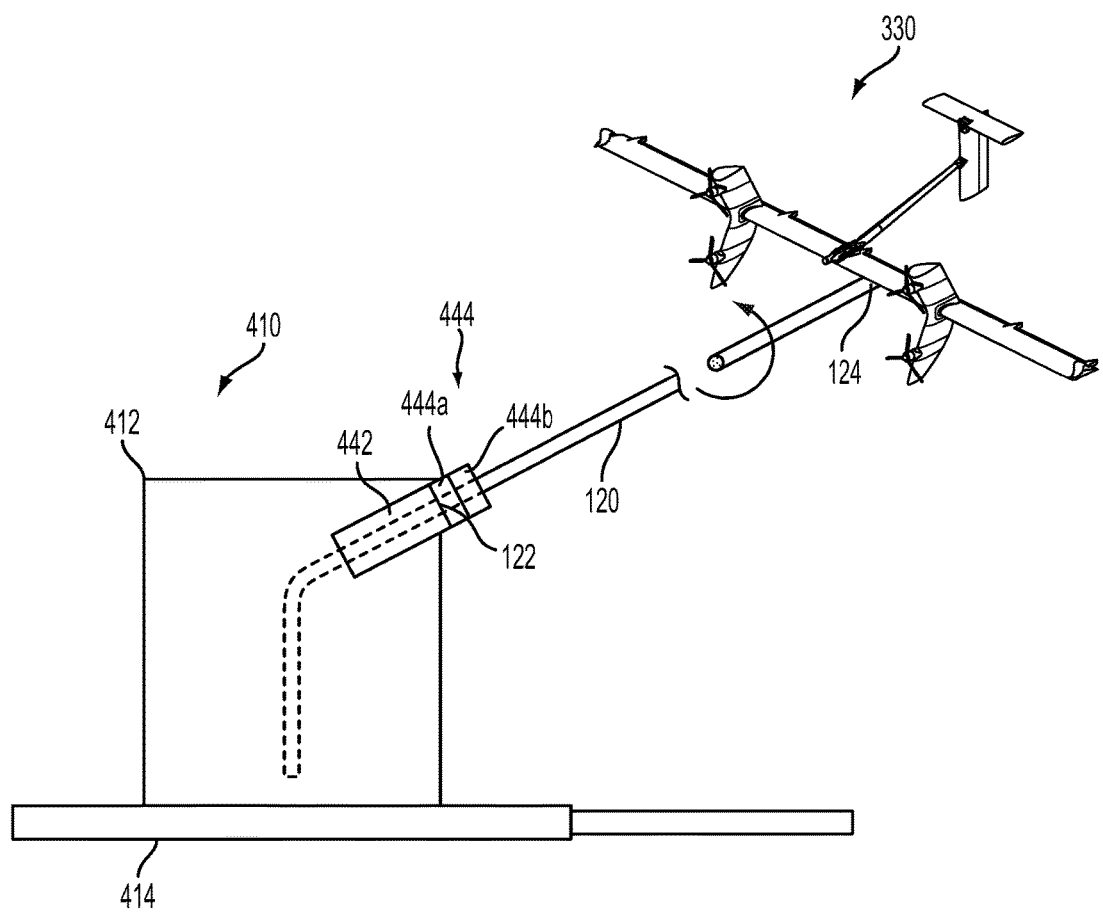
FIG. 4 depicts an aerial vehicle coupled to a ground station via a tether, according to an example embodiment.

FIG. 4 depicts the aerial vehicle 330 coupled to a ground station 410 via the tether 120, according to an example embodiment. Referring to FIG. 4, the ground station 410 may include a winch drum 412 and a platform 414. The ground station 110 and/or the ground station 210 may take the form of or be similar in form to the ground station 410. FIG. 4 is for illustrative purposes only and may not reflect all components or connections.

As shown in FIG. 4, the tether 120 may be coupled to a tether gimbal assembly 442 at a proximate tether end 122 and to the aerial vehicle 330 at a distal tether end 124. Additionally or alternatively, at least a portion of the tether 120 (e.g., at least one electrical conductor) may pass through the tether gimbal assembly 442. In some embodiments, the tether 120 may terminate at the tether gimbal assembly 442. Moreover, as shown in FIG. 4, the tether gimbal assembly 442 may also be coupled to the winch drum 412 which in turn may be coupled to the platform 414. In some embodiments, the tether gimbal assembly 442 may be configured to rotate about one or more axes, such as an altitude axis and an azimuth axis, in order to allow the proximate tether end 122 to move in those axes in response to movement of the aerial vehicle 330.

A rotational component 444 located between the tether 120 and the tether gimbal assembly 442 may allow the tether 120 to rotate about the long axis of the tether 120. The long axis is defined as extending between the proximate tether end 122 and the distal tether end 124. In some embodiments, at least a portion of the tether 120 may pass through the rotational component 444. Moreover, in some embodiments, the tether 120 may pass through the rotational component 444. Further, in some embodiments, the rotational component 444 may include a fixed portion 444a and a rotatable portion 444b, for example, in the form of one or more bearings and/or slip rings. The fixed portion 444a may be coupled to the tether gimbal assembly 442. The rotatable portion 444b may be coupled to the tether 120.

The use of the word fixed in the fixed portion 444a of the rotational component 444 is not intended to limit fixed portion 444a to a stationary configuration. In this example, the fixed portion 444a may move in axes described by the tether gimbal assembly 442 (e.g., altitude and azimuth), and may rotate about the ground station 410 as the winch drum 412 rotates, but the fixed portion 444a will not rotate about the tether 120, i.e., with respect to the long axis of the tether 120. Moreover, in this example, the rotatable portion 444b of the rotational component 444 may be coupled to the tether 120 and configured to substantially rotate with the rotation of tether 120.

Via the rotational component 444, the tether 120 may rotate about its centerline along the long axis as the aerial vehicle 330 orbits. The distal tether end 124 may rotate a different amount than the proximate tether end 122, resulting in an amount of twist along the length of the tether 120. With this arrangement, the amount of twist in the tether 120 may vary based on a number of parameters during crosswind flight of the aerial vehicle 330.

E. Illustrative Tethers

Figure 5:
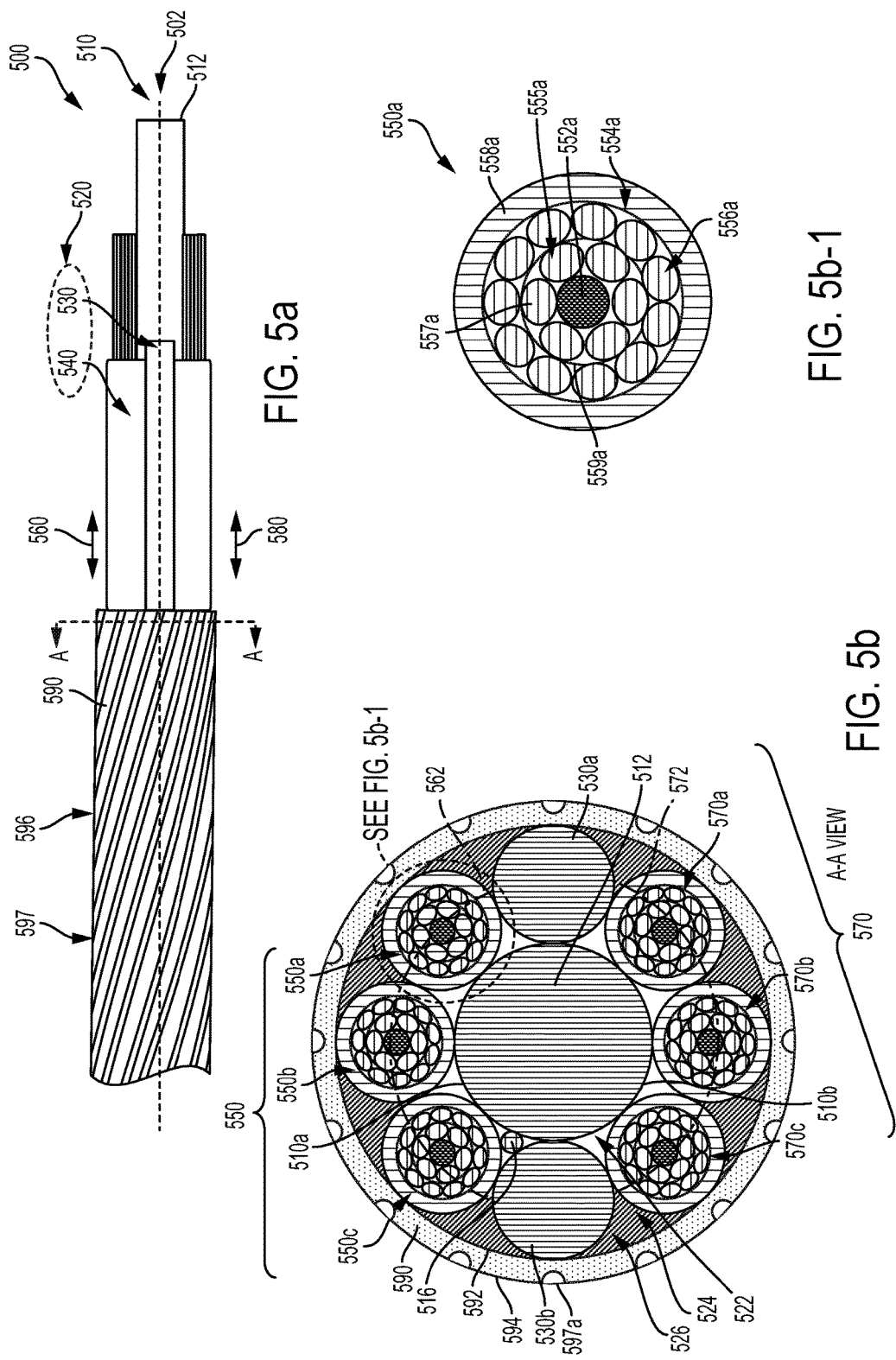
FIG. 5a depicts a tether, according to an example embodiment.
FIG. 5b depicts the tether shown in FIG. 5a in cross-section, according to an example embodiment.

FIG. 5a depicts a tether 500, according to an example embodiment. The tether 120 and/or the tether 220 may take the form of or be similar in form to the tether 500. FIG. 5a and the remaining Figures depicting tethers are for illustrative purposes only and may not reflect all components or connections. Further, as illustrations the Figures may not reflect actual operating conditions, but are merely to illustrate embodiments described. For example, while a perfectly straight tether may be used to illustrate the described tether embodiments, during orbiting crosswind flight the tether may in practice exhibit some level of droop between the ground station and the aerial vehicle. Further still, the relative dimensions in the Figures may not be to scale, but are merely to illustrate the embodiments described.

As shown in FIG. 5a, the tether 500 may include a core 510, a hybrid layer 520 (including elements 530 and 540 described below), and a jacket 590. The tether 500 may have a long axis 502. For purposes of illustration only, the tether 500 in FIG. 5a is shown with a portion of some components removed (e.g., the jacket 590 and the hybrid layer 520) to illustrate the arrangement of the components in the tether 500. Accordingly, FIG. 5a may be referred to as a partial cutaway view of the tether 500.

The core 510 may be a solid core and may comprise an axial rod 512. In some embodiments, the axial rod 512 may provide a significant contribution to the tensile strength and/or shear strength of the tether 500. Beneficially, the axial rod 512 may improve resistance of the tether 500 to fatigue loads while an AWT (e.g., the AWT 100 and/or AWT 200) is in operation. Further, the inclusion of axial rod 512 in the tether 500 may reduce fatigue loads on various other components of the tether 500, such as the hybrid layer 520.

The dimension of the axial rod 512 may be selected based at least in part on a weight of the tether 500, a predetermined bend diameter of the tether 500, and/or a predetermined loading of the tether 500, such as a predetermined fatigue and/or tensile loading of the tether 500. For use with AWTs, a preferred diameter of the axial rod 512 may be approximately 11 millimeters, with the overall tether 500 diameter of approximately 28 millimeters.

The axial rod 512 may take various different forms in various different embodiments. For example, in some embodiments, the axial rod 512 may comprise pultruded fiber rod, carbon fiber rod (e.g., T700 or T800), dry strength fiber (e.g., poly p-phenylene-2, 6 benzobisoxazole ("PBO"), such as Zylon), fiberglass, one or more metals (e.g., aluminum), epoxy, and/or a combination of carbon fiber, fiberglass, and/or one or more metals. As one example, the axial rod 512 may comprise a combination of fibers, such as a first carbon fiber having a first modulus and a second carbon fiber having a second modulus that is greater than the first modulus. As another example, the axial rod 512 may comprise carbon fiber and fiberglass or epoxy. Further, the axial rod 512 may comprise a matrix composite and/or carbon fiber and/or fiberglass, such as a metal matrix composite (e.g., aluminum matrix composite).

In some embodiments, the axial rod 512 may have a circular cross-section shape or may comprise other cross-section shapes. For example, in some embodiments, the axial rod 512 may have a rectangular cross-section shape, an oval cross-sectional shape, a trapezoidal cross-section shape, a pie-wedge cross-section shape, a triangular cross-section shape, a star-shaped cross-section shape, a cross-section shape that mates with round outer conductions, etc. In addition, in some embodiments, the axial rod 512 may have a cross-section shape that varies along the long axis 502 of the tether. Moreover, in some embodiments, the axial rod 512 may have a flexural modulus of approximately 100 gigapascals (GPa). Further, in some embodiments, the axial rod 512 may have a bend diameter of approximately 3 meters, with the overall bend diameter of the tether 500 of approximately 3 meters.

In some embodiments, the core 510 may be a cabled core and/or may comprise a plurality of core elements (not shown). Moreover, in some embodiments, the plurality of core elements may include a number of rods arranged in one or more layers. Further, in some embodiments, at least one core element may be wound around one or more core elements. Further still, in some embodiments, the plurality of core elements may be surrounded by a binding layer (not shown). In some such embodiments, the binding layer may comprise an outer surface of the core 510 (not shown).

FIG. 5b depicts the tether 500 in cross-section along line AA in FIG. 5a, according to an example embodiment. The cross-section depicted in FIG. 5b may be representative of the cross-section of the tether 500 along the long axis 502 of the tether 500. The hybrid layer 520 may surround the core 510. The hybrid layer 520 may include a plurality of strength members 530 and a plurality of electrical conductor bundles 540 (including elements 550 and 570 described below).

Beneficially, the hybrid layer 520 may reduce a bend diameter of the tether 500 as compared to a similar or identical tether without the hybrid layer 520, which may improve the flexibility of the tether 500.

The plurality of strength members 530 and the plurality of electrical conductor bundles 540 may be wound around the core 510. For instance, in some embodiments, the plurality of strength members 530 and the plurality of electrical conductor bundles 540 may be helically wound around the core 510. Further, in some embodiments, the plurality of strength members 530 and the plurality of electrical conductor bundles 540 may have a planetary, right-hand lay. However, in other embodiments, the plurality of strength members 530 and the plurality of electrical conductor bundles 540 may have a planetary, left-hand lay. The plurality of strength members 530 and the plurality of electrical conductor bundles 540 may have a lay with a fixed setup, a planetary setup, or a planetary setup with back twist compensation. Further still, in some embodiments, the plurality of strength members 530 and the plurality of electrical conductor bundles 540 may be wound around the core 510 with a helical angle between 1 to 5 degrees, such as 2 degrees or 3 degrees. The helical angle may be relative to the long axis 502 of the tether 500. Moreover, in some embodiments, the plurality of strength members 530 and the plurality of electrical conductor bundles 540 may surround the core 510 and each strength member and electrical conductor bundle may be straight (i.e., a helical angle of 0 degrees).

In addition, the plurality of strength members 530 and the plurality of electrical conductor bundles 540 may have a variety of lay lengths. For instance, in some embodiments, the plurality of strength members 530 and the plurality of electrical conductor bundles 540 may include a lay length of approximately 1650 millimeters. In some embodiments, lay length may refer to an axial distance to wrap a particular strength member or electrical conductor bundle around the core 510.

The plurality of strength members 530 may provide a contribution to the tensile strength and/or shear strength of the tether 500. Beneficially, the plurality of strength members 530 may improve resistance of the tether 500 to fatigue loads while an AWT (e.g., the AWT 100 and/or AWT 200) is in operation. Further, the inclusion of the plurality of strength members 530 may reduce fatigue loads on various components of the tether 500, such as the plurality of electrical conductor bundles 540.

The plurality of strength members 530 may take various different forms in various different embodiments. In some embodiments, the plurality of strength members 530 may include two strength members: a first strength member 530a and a second strength member 530b. Moreover, in some embodiments, first strength member 530a may be spaced apart from the second strength member by about 180 degrees along a circumference of the core 510. However, in other embodiments, the plurality of strength members 530 may include more than two strength members. Moreover, in other embodiments, the strength members of the plurality of strength members 530 may be spaced apart from other strength members of the plurality of strength members 530 by more or less than 180 degrees along the circumference of the core 510.

In some embodiments, the first strength member 530a may comprise any of the materials that the axial rod 512 may comprise. For instance, in some embodiments, the first strength member 530a may include carbon fiber. Moreover, in some embodiments, the first strength member 530a may have a preferred diameter of approximately 7 millimeters. In addition, in some embodiments, the first strength member 530a may comprise any cross-section shape of the axial rod 512. For instance, the first strength member 530a may comprise a circular-cross section shape. Further, in some embodiments, the first strength member 530a may have the same flexural modulus as the axial rod 512. Further still, in some embodiments, the first strength member 530a may have a bend diameter of approximately 1.85 meters.

In some embodiments, the first strength member 530a may have a different material than the axial rod 512. For example, in some embodiments, the first strength member 530a may comprise T800 carbon fiber and the axial rod 512 may comprise T700 carbon fiber.

Moreover, in some embodiments, the second member 530b may have the same material, same cross-section shape, same flexural modulus, and/or same bend diameter as the first strength member 530a. However, in other embodiments, the second member 530b may have different materials, diameter, cross-section shape, flexural modulus, and/or bend diameter than the first strength member 530a.

The plurality of electrical conductor bundles 540 may be configured to transmit electricity. For example, the plurality of electrical conductor bundles 540 may be configured for high-voltage AC or DC power transmission (e.g., greater than 1,000 volts). For instance, the plurality of electrical conductor bundles 540 may be configured to carry an AC or DC voltage of between 1 kilovolt and 5 kilovolts, or higher, and an associated power transmission current of between 50 amperes to 250 amperes.

FIG. 5b-1 depicts an electrical conductor bundle 550a of the plurality of electrical conductor bundles 540, according to an example embodiment. The electrical conductor bundle 550a may include a compliant element 552a, a plurality of electrical conducting elements 554a, and an insulating layer 558a. Beneficially, the electrical conductor bundle 550a may reduce an amount of insulation for the plurality of electrical conducting elements 554a as compared to individually insulating the electrical conducting elements, which may reduce a weight of the tether 500.

In some embodiments, the electrical conductor bundle 550a may have a circular cross-section shape, and may have an overall diameter similar to the diameter of the first strength member 530a. However, in other embodiments, the electrical conductor bundle 550a may have a diameter that is more or less than the diameter of the first strength member 530a.

The compliant element 552a may take various different forms in various different embodiments. For example, in some embodiments, the compliant element 552a may include nylon, a plastic, and/or a polymer. Moreover, in some embodiments, the compliant element 552a may have a preferred diameter of approximately 1 millimeter. In addition, in some embodiments, the compliant element 552a may comprise any cross-section shape of the axial rod 512. For instance, the compliant element 552a may comprise a circular cross-section shape. In some embodiments, as the softness of the compliant element 552a increases, the stretch of the electrical conductor bundle 550a may improve.

The plurality of electrical conducting elements 554a may take various different forms in various different embodiments. For example, in some embodiments, the plurality of electrical conducting elements 554a may include two layers: a first layer 555a and a second layer 556a. In particular, as shown in FIG. 5b-1, the first layer 555a may include six electrical conducting elements and the second layer 556a may include eleven electrical conducting elements located around the first layer 555a. With this arrangement, the plurality of electrical conducting elements 554a may include seventeen electrical conducting elements.

However, in other embodiments, the plurality of electrical conducting elements 554a may include more or less than seventeen electrical conducting elements. In addition, in other embodiments, the plurality of electrical conducting elements 554a may be arranged in more or less than two layers.

The plurality of electrical conducting elements 554a may include an electrical conducting element 557a. As shown in FIG. 5b-1, the first layer 555a may include the electrical conducting element 557a. The electrical conducting element 557a may be configured to conduct electric current. In some embodiments, the electrical conducting element 557a may comprise aluminum, copper, an alloy of aluminum, an alloy of copper, hardened or annealed aluminum, hardened or annealed copper, copper clad aluminum, or any other material which may allow for the conduction of electric current. Moreover, in some embodiments, the electrical conducting element 557a may have a preferred diameter of approximately 1 millimeter. Further, in some embodiments, the diameter of the electrical conducting element 557a may be selected based at least in part on a size of the tether 500, a predetermined amount of electrical power transmission of the tether 500, an operating voltage, and/or an operating temperature. Further still, in some embodiments, the electrical conducting element 557a may have a round shape, a rectangular shape, or a trapezoidal shape.

In some embodiments, the other electrical conducting elements of the plurality of electrical conducting elements 554a may take the form of or be similar in form to the electrical conducting element 557a. However, in other embodiments, at least two electrical conducting elements of the plurality of electrical conducting elements 554a may have different materials, diameters, and/or shapes.

The plurality of electrical conducting elements 554a may surround the compliant element 552a. For instance, in some embodiments, the plurality of electrical conducting elements 554a may be wound around the compliant element 552a. Moreover, in some embodiments, the plurality of electrical conducting elements 554a may be helically wound around the compliant element 552a with a helical angle between 30 to 40 degrees, such as 35 degrees or 37 degrees. Further, in some embodiments, the plurality of electrical conducting elements 554a may surround the compliant element 552a and each electrical conducting element may be straight (i.e., a helical angle of 0 degrees).

In addition, the plurality of electrical conducting elements 554a may have a variety of lay lengths. As one example, the plurality of electrical conducting elements 554a may have a lay length between 10 to 25 millimeters, such as approximately 11 millimeters, 12 millimeters, 20 millimeters, and 23 millimeters. In some embodiments, lay length may refer to an axial distance to wrap an electrical conducting element around the compliant element 552a.

In some embodiments, the first layer 555a and the second layer 556a may be wound around the compliant element 552a with the same helical angle. However, in other embodiments, the first layer 555a and the second layer 556a may be wound around the compliant element 552a with different helical angles. Moreover, in some embodiments, the first layer 555a and the second layer 556a may each be wound around the compliant element 552a in the same direction (e.g., planetary, right-hand lay; planetary, left-hand lay; and non-planetary lays). The first layer 555a and the second layer 556a may have a lay with a fixed setup, a planetary setup, or a planetary setup with back twist compensation.

However, in other embodiments, the first layer 555a and the second layer 556a may be wound around the compliant element 552a in opposite directions. Further, in some embodiments, the first layer 555a and the second layer 556a may each have the same lay length. However, in other embodiments, the first layer 555a and the second layer 556a may have different lay lengths (e.g., first layer 555a may have a lay length of approximately 11 or 12 millimeters, and second layer 556a may have a lay length of approximately 20 or 23 millimeters).

The insulating layer 558a may surround the plurality of electrical conducting elements 554a. The insulating layer 558a may take various different forms in various different embodiments. For example, in some embodiments, the insulating layer 558a may comprise Tefzel and/or similar flouropolymers, thermoplastic elastomer ("TPE"), polypropylene, ethylene propylene rubber ("EPR"), polyethylene, polytetrafluoroethylene, Kaptan, and/or a 4-methylpentene-1-based olefin copolymer (e.g., TPX). Further, in some such embodiments, the insulating layer 558a may have a preferred thickness of approximately 0.7 millimeters. In some embodiments, the thickness of the insulating layer 558a may be selected based at least in part on a size of the electrical conducting element 557a, a size of the tether 500, a predetermined amount of electrical power transmission of the tether 500, an operating voltage, and/or an operating temperature. In some embodiments, as a rigidity of the insulating layer 558 increases, compression loading (e.g., axial and transverse) of the electrical conductor bundle 550a may improve.

The electrical conductor bundle 550a may further include a capping layer 559a between the first layer 555a and the second layer 556a. The capping layer 559a may separate the first layer 555a from the second layer 556a. In addition, the capping layer 559a may reduce a contact pressure between at least one electrical conducting element of the first layer 555a and at least one electrical conducting element of the second layer 556a. Moreover, in some embodiments, the capping layer 559a may have a hardness that is greater than a hardness of the first layer 555a and the second layer 556a. However, in other embodiments, the electrical conductor bundle 550a might not include the capping layer 559a.

The plurality of electrical conductor bundles 540 may include at least two groups of electrical conductor bundles. In some embodiments, the plurality of electrical conductor bundles 540 may include a first group of electrical conductor bundles 550 and a second group of electrical conductor bundles 570. The first group of electrical conductor bundles 550 may define a first electrical path 560, and the second group of electrical conductor bundles 570 may define a second electrical path 580 that is different from the first electrical path 560. The first electrical path 560 and the second electrical path 580 may each span the long axis 502 of the tether 500.

In some embodiments, the first group of electrical conductor bundles 550 may be located around a first portion 510a of the core 510, such that a cross-section of the first group of electrical conductor bundles 550 defines a first arc 562 along the first portion 510a of the core 510. Moreover, in some embodiments, the first arc 562 may take the form of a semi-circle or a portion of a circle. Further, the first group of electrical conductor bundles 550 may be located between the first strength member 530a and the second strength member 530b.

In addition, in some embodiments, the second group of electrical conductor bundles 570 may be located around a second portion 510b of the core 510, such that a cross-section of the second group of electrical conductor bundles 560 defines a second arc 572 along the second portion 510b of the core 510. Moreover, in some embodiments, the second arc 572 may take the form of a semi-circle or a portion of a circle. Further, in some embodiments, the second arc 572 may be substantially symmetrical to the first arc 562. Moreover, the second group of electrical conductors 570 may be located between the first strength member 530a and the second strength member 530b. The term "substantially symmetrical," as used in this disclosure, means exactly symmetrical or one or more deviations from exactly symmetrical that do not significantly impact transmission of electricity as described herein.

In some embodiments, the first group of electrical conductor bundles 550 may include three electrical conductor bundles 550a-c. However, in other embodiments, the first group of electrical conductor bundles 550 may comprise more or less than three electrical conductor bundles. The number of electrical conductor bundles of the first group of electrical conductor bundles 550 may be selected based at least in part on a size of the tether 500, a predetermined amount of electrical power transmission along the first electrical path 560, a predetermined amount of electrical power transmission of the tether 500, an operating voltage, and/or an operating temperature.

Moreover, in some embodiments, the second group of electrical conductor bundles 570 may include three electrical conductor bundles 570a-c. However, in other embodiments, the second group of electrical conductor bundles 570 may comprise more or less than three electrical conductor bundles. The number of electrical conductor bundles of the second group of electrical conductor bundles 570 may be selected based at least in part on a size of the tether 500, a predetermined amount of electrical power transmission along the second electrical path 580, a predetermined amount of electrical power transmission of the tether 500, an operating voltage, and/or an operating temperature.

In some embodiments, the first group of electrical conductor bundles 550 may have the same number of electrical conductor bundles as the second group of electrical conductor bundles 570. However, in other embodiments, the first group of electrical conductor bundles 550 may have more or less electrical conductor bundles than the second group of electrical conductor bundles 570.

Accordingly, in some embodiments, the plurality of electrical conductor bundles 540 may include six electrical conductor bundles 550a-c, 570a-c. However, in other embodiments, the plurality of electrical conductor bundles 540 may include more or less than six electrical conductor bundles. The number of electrical conductor bundles of the plurality of electrical conductor bundles 540 may be selected based at least in part on a size of the tether 500, a predetermined amount of electrical power transmission of the tether 500, an operating voltage, and/or an operating temperature.

Further, in some embodiments, the first group of electrical conductor bundles 550 and the second group of electrical conductor bundles 570 may be configured to operate differently. For instance, in an AC power transmission arrangement, the first group of electrical conductor bundles 550 may be configured to carry a first phase of electrical power along the first electrical path 560, and the second group of electrical conductors 570 may be configured to carry a second phase of electrical power along the second electrical path 580 that is different from the first phase of electrical power. Moreover, in a DC power transmission arrangement, the first group of electrical conductors 550 may be configured to operate at a first potential along the first electrical path 560, and the second group of electrical conductors 570 may be configured to operate at a second potential along the second electrical path 580 that is different from the first potential. As one example, the first potential may be +2000 volts relative to ground, and the second potential may be −2000 volts relative to ground. As another example, the first potential may be a high voltage, and the second potential may be near ground potential.

In some embodiments, the electrical conductor bundles 550b-c and 570a-c may each take the form of or be similar in form to the electrical conductor bundle 550a. However, in other embodiments, at least two electrical conductor bundles of the plurality of electrical conductor bundles 540 may have different number of electrical conducting elements, materials, diameters, thicknesses, and/or cross-section shapes.

The jacket 590 may surround the hybrid layer 520. The jacket may include an inner surface 592 that covers the hybrid layer 520, and an outer surface 594 that is opposite the inner surface 592. The jacket 590 may take various different forms in various different embodiments. For example, in some embodiments, the jacket 590 may comprise hytrel, a thermoplastic polyurethane ("TPU"), polypropylene, nylon, and/or a semiconductive material, such as a polymer compound. Moreover, in some embodiments, the jacket 590 may be extruded over the hybrid layer 520. Further, in some embodiments the jacket 590 may have a preferred thickness of 1.5 millimeters.

In some embodiments, one or more materials of the jacket 590 may be selected to increase the visibility of the tether 500 to humans and/or animals. For instance, in some embodiments, the jacket 590 may include materials that have a white or bright color, or a contrasting color pattern (e.g., a painted pattern). Further, in some embodiments, the jacket 590 may include a material or coating that reflects ultra-violet (UV) light, glows, or a combination of UV reflection and glowing.

The outer surface 594 of the jacket 590 may comprise a plurality of drag-affecting surface features 596. The plurality of drag-affecting surface features 596 may be configured to affect drag of the tether 500, for example when exposed to wind or movement through air. As one example, the plurality of drag-affecting surface features 596 may reduce the drag of the tether 500. As another example, the plurality of drag-affecting surface features 596 may increase the drag of the tether 500.

The plurality of drag-affecting surface features 596 may take various different forms in various different embodiments. In some embodiments, the plurality of drag-affecting surface features 596 may comprise a plurality of flutes 597 (e.g., grooves) in the outer surface 594 of the jacket 590. As shown in FIG. 5b, in some embodiments, the plurality of flutes 597 may include sixteen flutes (flute 597a of the plurality of flutes 597 labeled in FIG. 5b). However, in other embodiments, the plurality of flutes 597 may include more or less than sixteen flutes and/or the plurality of flutes 597 may have a different pitch. In addition, in some embodiments, each flute of the plurality of flutes 597 may have the same depth and same radius. However, in other embodiments, at least two flutes of the plurality of flutes 597 may have different depths and/or a different radii. As one example, flute 597a may have a depth of 0.6 millimeters and a diameter of 1.6 millimeters. Further, in some embodiments, at least one flute of the plurality of flutes 597 may have a circular cross-section shape, a triangular cross-section shape, a rectangular cross-section shape, or a varying cross-section shape. In addition, in some embodiments, each flute of the plurality of flutes 597 may have the same cross-section shape. However, in other embodiments, at least two flutes of the plurality of flutes 597 may have different cross-section shapes.

Moreover, in some embodiments, the plurality of drag-affecting surface features 596 may include a plurality of strakes (e.g., ridges) protruding from the outer surface 594 of the jacket 590, a plurality of dimples, tape with riblets, or any other textured shape/material that can affect drag of the tether 500. In addition, the plurality of surface features 596 may include one or more of flutes, strakes, dimples, and tape with riblets. With this arrangement, the plurality of surface features 596 may comprise a combination of flutes, strakes, dimples and/or tape with riblets.

The plurality of drag-affecting surface features 596 may be arranged on the outer surface 594 of the jacket 590 in a variety of ways. For instance, in some embodiments, the plurality of drag-affecting surface features 596 may be disposed on the outer surface 594 along the long axis 502 of the tether 500. Further, in some embodiments, the plurality of drag-affecting surface features 596 may be disposed on the outer surface 594 in a helical pattern. In some such embodiments, the helical pattern may be based on a fixed helical angle and/or a varying helical angle. In some embodiments, the fixed helical angle may be between 10 and 20 degrees, such as 14 degrees. Further still, in some embodiments, the plurality of drag-affecting surface features 596 may be disposed on the outer surface 594 in an oscillating path. Moreover, in some embodiments, at least a portion of the plurality of drag-affecting surface features 596 may be disposed on the outer surface 594 along the long axis 502 of the tether 500, in a helical pattern with a fixed or varying helical angle, or in an oscillating path. With this arrangement, the plurality of drag-affecting surface features 596 may comprise surface features arranged on the outer surface 594 in a combination of being disposed along the long axis 502 of the tether 500, in a helical pattern with a fixed or varying helical angle, and/or in an oscillating path.

In some embodiments, when the jacket 590 is extruded, the plurality of surface drag-affecting features 596 may be manufactured during the extrusion of the jacket 590. Moreover, in some embodiments, the plurality of drag-affecting surface features 596 may be added to and/or removed from the outer surface 594 of the jacket 590 after the jacket 590 is manufactured.

In some embodiments, the core 510 may include an abrasion resistant layer. With this arrangement, the abrasion resistant layer may reduce wear between the core 510 and the hybrid layer 520. In some such embodiments, an outer surface of the axial rod 512 may include the abrasion resistant layer.

Moreover, in some embodiments, at least one strength member of the plurality of strength members 530 (e.g., first strength member 530a) may include an abrasion resistant layer. With this arrangement, the abrasion resistant layer may reduce wear between the layered strength member and the core 510 and/or adjacent electrical conductor bundles of the plurality of electrical conductor bundles 540. In some such embodiments, an outer surface of the strength member may include the abrasion resistant layer.

Further, in some embodiments, the core 510 and the plurality of strength members 530 may each include an abrasion resistant layer. With this arrangement, the abrasion resistant layers may reduce wear between the core 510 and the plurality of strength members 530 and/or the plurality of electrical conductor bundles 540, and/or wear between the plurality of strength members 530 and the plurality of electrical conductor bundles 540.

In some embodiments, the abrasion resistant layer may comprise a thin pultruded layer, a hard peek layer, a polymer, a film, and/or a coating. Moreover, in some embodiments, the abrasion resistant layer may be a sacrificial layer that wears (or degrades) during operation of an AWT (e.g., the AWT 100 and/or 200).

The hybrid layer 520 may surround the core 510, such that first interstices 522 are located between adjacent components of the hybrid layer 520 (e.g., strength members or electrical conductor bundles) and the core 510, and second interstices 524 are located between adjacent components of the hybrid layer 520 and the jacket 590. For instance, an interstice of the first interstices 522 may be located between the core 510, the second strength member 530b, and the electrical conductor bundle 570c, and an interstice of the second interstices 524 may be located between the inner surface 592 of the jacket 590, the second strength member 530b, and the electrical conductor bundle 570c.

In some embodiments, the tether 500 may further include at least one fiber optic cable, coaxial conductor, and/or sensor 516 (e.g., temperature sensor or strain sensor). The fiber optic cable or coaxial conductor may be configured for communication between an aerial vehicle (e.g., the aerial vehicle 330) and a ground station (e.g., the ground station 410). In some embodiments, the fiber optic cable, coaxial conductor, or sensor 516 may be located between a strength member of the plurality of strength members 530 and an electrical conductor bundle of the plurality of electrical conductor bundles 540. For example, the fiber optic cable, coaxial conductor, or sensor 516 may be located in one of the first interstices 522 or one of the second interstices 524. As another example, the fiber optic cable, coaxial conductor, or sensor 516 may be included in the axial rod 512 and/or one of the strength members of the plurality of strength members 530. For instance, the fiber optic cable, coaxial conductor, or sensor 516 may be co-pultruded with the axial rod 512 and/or one of the strength members of the plurality of strength members 530. However, in some embodiments, the tether 500 might not include the fiber optic cable, coaxial conductor, or sensor 516.

Further, in some embodiments, the tether 500 may further include a fill material 526 located between the core 510 and jacket 590, such that the fill layer fills the second interstices 524 and/or first interstices 522. In some embodiments, the fill material 526 may block moisture from the plurality of electrical conductor bundles 540. For instance, in some embodiments, the fill material 526 may block moisture from diffusing inside of the tether 500 along the plurality of electrical conductor bundles 540. In addition, in some embodiments, the fill material 526 may dissipate heat from other components of the tether 500, such as the plurality of electrical conductor bundles 540.

Moreover, in some embodiments, the fill material 526 may include a vulcanizing rubber or silicone, such as a room-temperature vulcanizing rubber. In addition, the fill material 526 may include mylar or a metal, such as aluminum. Further, in some embodiments, the fill material 526 may comprise one or more filler rods, fibers, and/or tapes. However, in some embodiments, the tether 500 might not include the fill material 526.

In some embodiments, the tether 500 may further include a mylar tape layer (not shown) wrapped around the hybrid layer 520. With this arrangement, when the tether 500 includes the fill material 526, the mylar tape layer may hold the fill material 526 and the plurality of strength members 530 and plurality of electrical conductor bundles 540 in place (e.g., while the fill material 526 cures). In some implementations, the mylar tape layer may be located between the inner surface 592 of the jacket 590 and the hybrid layer 520. However, in some embodiments, the tether 500 might not include a mylar tape layer. Further still, in some embodiments, the tether 500 may have a linear density of approximately 0.82 kilogram/meter.

Moreover, in some embodiments, the tether 500 may further include a lightning shield (not shown) wrapped around the hybrid layer 520 and/or mylar tape layer. With this arrangement, the lightning shield may be configured to transmit current from a lightning strike to the ground. In some embodiments, the lightning shield may be located between the inner surface 592 of the jacket 590 and the hybrid layer 520 or the mylar tape layer. Moreover, in some embodiments, the lightning shield may include annealed aluminum. Further, in some embodiments, the lightning shield may include a foil layer and/or a braid layer. When the tether 500 does not include the mylar tape layer, the lightning shield may hold the fill material 526 and the plurality of strength member 530 and plurality of electrical conductor bundles 540 in place (e.g., while the fill material 526 cures).

Although the tether 500 is described above as including a first group of electrical conductor bundles 550 and a second group of electrical conductor bundles 570, in other examples, tethers may include more than two groups of electrical conductor bundles. For instance, in some embodiments, a tether may include a first group of electrical conductor bundles defining a first electrical path, a second group of electrical conductor bundles defining a second electrical path that is different from the first electrical path, and a third group of electrical conductor bundles defining a third electrical path that is different from the first and second electrical paths. The first group of electrical conductor bundles may be located around a first portion of the core, such that a cross-section of the first group of electrical conductor bundles defines a first arc along the first portion of the core, the second group of electrical conductor bundles may be located around a second portion of the core, such that a cross-section of the second group of electrical conductor bundles defines a second arc along the second portion of the core, and the third group of electrical conductor bundles may be located along a third portion of the core, such that a cross-section of the third group of electrical conductor bundles defines a third arc along the third portion of the core. In some embodiments, the first portion of the core may comprise a first third of a circumference of the core, the second portion of the core may comprise a second third of the circumference of the core, and the third portion of the core may comprise a third of the circumference of core.

In some embodiments, the first group of electrical conductors may be configured to carry a first phase of electrical power, the second group of electrical conductors may be configured to carry a second phase of electrical power that is different from the first phase of electrical power, and the third group of electrical conductors may be configured to carry a third phase of electrical power that is different from the first and second phases of electrical power.

Further, although the tether 500 described above includes two strength members and six electrical conductor bundles, in other implementations, a tether may include four strength members and four electrical conductor bundles.

Figure 6:
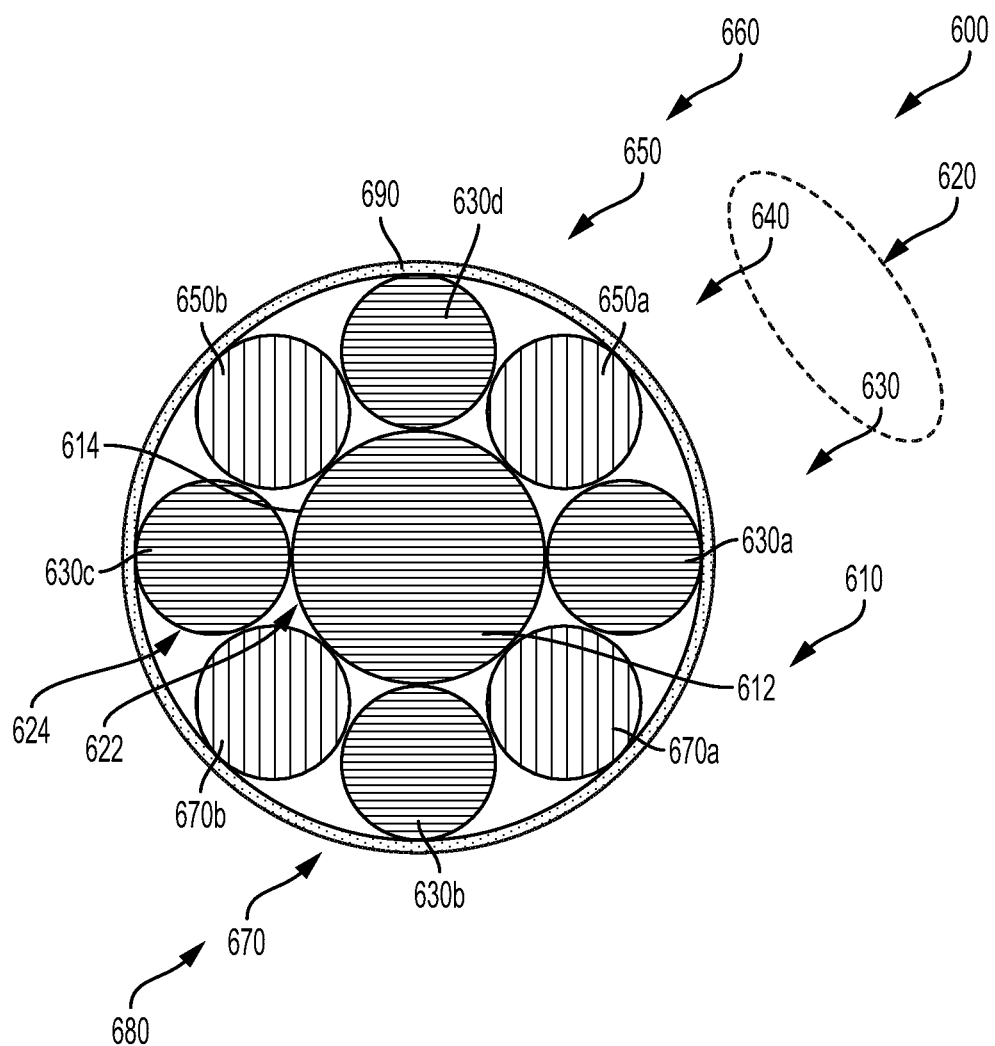
FIG. 6 depicts a tether, according to an example embodiment.

FIG. 6 depicts a tether 600, according to an example embodiment. The tether 120 and/or the tether 220 may take the form of or be similar in form to the tether 600. The tether 600 may include a core 610, a hybrid layer 620 (including elements 630 and 640 described below) surrounding the core 610, and a jacket 690 surrounding the hybrid layer 620. The core 610 may include an axial rod 612.

The core 610 may be of the same configuration and function in a similar manner as the core 510, the axial rod 612 may be of the same configuration and function in a similar manner as the axial rod 512, and the jacket 690 may be of the same configuration and function in a similar manner as jacket 590.

The hybrid layer 620 may include a plurality of strength members 630 and a plurality of electrical conductor bundles 640 (including elements 650 and 670 described below). The plurality of strength members 630 and the plurality electrical conductor bundles 640 may be wound around the core 610 in the same or similar way as the plurality of strength members 530 and the plurality of electrical conductor bundles 540 are wound around the core 510.

The plurality of strength members 630 may function in a similar manner as the plurality of strength members 530. In some embodiments, the plurality of strength members 630 may include four strength members 630a-d. Moreover, in some embodiments, each strength member of the plurality of strength members 630 may be located around a respective portion of the core 610, and each strength member of the plurality of strength members 630 is spaced apart from two other strength members of the plurality of strength members 630 by about 90 degrees along a circumference of the core 610. Further, in some embodiments, each strength member of the plurality of strength members 630 may be of the same configuration and function in a similar manner as the first strength member 530a. However, in some embodiments, at least two strength members of the plurality of strength members 630 may have different materials, diameters, cross-section shapes, flexural moduli, and/or bend diameters.

The plurality of electrical conductor bundles 640 may function in a similar manner as the plurality of electrical conductor bundles 540. In some embodiments, the plurality of electrical conductor bundles 640 may include a first group of electrical conductor bundles 650 that defines a first electrical path 660, and a second group of electrical conductor bundles 670 that defines a second electrical path 680 that is different than the first electrical path 660. Moreover, in some embodiments, the first group of electrical conductor bundles 650 may include two electrical conductor bundles 650a-b and may be located around a first half of a circumference 614 of the core 610. Further, in some embodiments, the second group of electrical conductor bundles 670 may include two electrical conductor bundles 670a-b and may be located around a second half of the circumference 614 of the core 610. In examples where the core 610 may include a non-circular cross-section shape, element 614 may refer to a perimeter of the core 610. Similar elements in remaining tether figures may also refer to the perimeter of a core in similar examples.

As shown in FIG. 6, each electrical conductor bundle of the plurality of electrical conductor bundles 640 may be located between two strength members of the plurality of strength members 630 (e.g., electrical conductor bundle 650a may be located between strength member 630a and strength member 630d).

The first electrical path 660 may be of the same configuration and function in a similar manner as the electrical path 560, and the second electrical path 680 may be of the same configuration and function in a similar manner as the second electrical path 580. In addition, in some embodiments, each electrical conductor bundle of the plurality of electrical conductor bundles 640 may be of the same configuration and function in a similar manner as the electrical conductor bundle 550a. However, in other embodiments, at least two electrical conductor bundles of the plurality of electrical conductor bundles 640 may have a different number of electrical conducting elements, materials, diameters, thicknesses, and/or cross-section shapes.

Moreover, in some embodiments, the hybrid layer 620 surrounds the core 610, such that first interstices 622 are located between adjacent components of the hybrid layer 620 (e.g., strength members or electrical conductor bundles) and the core 610, and second interstices 624 are located between adjacent components of the hybrid layer 620 and the jacket 690. The first interstices 622 may have a similar configuration and function in a similar manner as the first interstices 522, and the second interstices 624 may have a similar configuration and function in a similar manner as the second interstices 524. In addition, in some embodiments, the tether 600 may further include a fill material (not shown) that fills the first interstices 622 and/or the second interstices 624 similar to fill material 526. Further, the tether 600 may further include fiber optic cable, coaxial conductor, and/or sensor (not shown) similar to the fiber optic cable, coaxial conductor, or sensor 516. Further still, the tether 600 may further include a mylar tape layer (not shown) and/or lightning shield (not shown) similar to tether 500.

In some implementations, a tether may include strength members that include a non-circular cross-section shape. Beneficially, strength members that include a non-circular cross-section shape may improve packing of the tether.

FIG. 7a depicts a tether 700, according to an example embodiment. The tether 120 and/or the tether 220 may take the form of or be similar in form to the tether 700. For purposes of illustration only, the tether 700 in FIG. 7a is shown with a portion of some components removed to illustrate the arrangement of components in the tether 700 in a similar way as the tether 500 in FIG. 5a. Further, FIG. 7b depicts the tether 700 in cross-section along line AA in FIG. 7a, according to an example embodiment.

The tether 700 may include a core 710, a hybrid layer 720 (including elements 730 and 740 described below) surrounding the core 710, and a jacket 790 surrounding the hybrid layer 720. The core 710 may include an axial rod 712. The jacket 790 may be of the same configuration and function in a similar manner as the jacket 590. The core 710 may be of a similar configuration and function in a similar manner as the core 510, and the axial rod 712 may be of a similar configuration and function in a similar manner as the axial rod 512. In some embodiments, the axial rod 712 may have a bend diameter of approximately 2.5 meters, with the overall tether 700 bend diameter of approximately 2.5 meters. In addition, the tether 700 may have a diameter of approximately 27 millimeters. Further, the tether may have a linear density of approximately 0.80 kg/m.

The hybrid layer 720 may include a plurality of strength members 730 and a plurality of electrical conductor bundles 740 (including elements 750 and 770 described below). The plurality of strength members 730 and the plurality of electrical conductor bundles 740 may be wound around the core 710 in the same or similar way as the plurality of strength members 530 and the plurality of electrical conductor bundles 540 are wound around the core 510. In some embodiments, the plurality of strength members 730 and the plurality of electrical conductor bundles 740 may each have a lay length of approximately 1450 millimeters.

The plurality of strength members 730 may function in a similar manner as the plurality of strength members 530. In some embodiments, the plurality of strength members 730 may include four strength members 730a-d. However, in other embodiments, the plurality of strength members 730 may include more or less than four strength members. Moreover, in some embodiments, each strength member of the plurality of strength members 730 is located around a respective portion of the core 710, and each strength member of the plurality of strength members 730 is spaced apart from two other strength members of the plurality of strength members 730 by about 90 degrees along a circumference of the core 710.

In some embodiments, the strength member 730a may include any of the materials of the first strength member 530a. For instance, in some embodiments, the strength member 730a may comprise carbon fiber. Moreover, in some embodiments, the strength member 730a may have the same flexural modulus as the first strength member 530a. Further, in some embodiments, the strength member 730a may have a bend diameter of approximately 2.25 meters.

As shown in FIG. 7b, the strength member 730a may include a non-circular cross-section shape. For example, the cross-section shape of the strength member 730a may take the form of a wedge. In some embodiments, the cross-section shape of the strength member 730a may include an inner portion 730a-1 and an outer portion 730a-2. The inner portion 730a-1 may contact the core 710, and the outer portion 730a-2 may contact the jacket 790. Moreover, in some embodiments, the outer portion 730a-2 may be wider than the inner portion 730a-1. Further, in some embodiments, a distance between the inner portion 730a-1 and outer portion 730a-2 may be approximately 8 millimeters. Further still, in some embodiments, the outer portion 730a-2 may comprise about 27 degrees of a circumference of the tether 700.

In some embodiments, the strength members 730b-d may each have the same material, same flexural modulus, same bend diameter, and/or same cross-section shape as the strength member 730a. With this arrangement, each strength member of the plurality of strength members 730 may include a non-circular cross-section shape. However, in other embodiments, at least two strength members of the plurality of strength members 730 may have different materials, flexural moduli, bend diameters, and/or cross-section shapes.

The plurality of electrical conductor bundles 740 may be similar in form to the plurality of electrical conductor bundles 640. Accordingly, components in FIG. 7b similar to those in FIG. 6 may be of the same configuration and function in a similar manner. For instance, in some embodiments, each electrical conductor bundle of the plurality of electrical conductor bundles 740 may include a circular cross-section shape.

As shown in FIG. 7, the plurality of electrical conductor bundles 740 may include a first group of electrical conductor bundles 750 (including elements 750a and 750b) defining a first electrical path 760, and a second group of electrical conductor bundles 770 (including elements 770a and 770b) defining a second electrical path 780 that is different than the first electrical path 760. The first group of electrical conductor bundles 750 may be located around a first half of a circumference 714 of the core 710, and the second group of electrical conductor bundles 770 may be located around a second half of a circumference 714 of the core 710. Moreover, as shown in FIG. 7, each electrical conductor bundle of the plurality of electrical conductor bundles 740 may be located between two strength members of the plurality of strength members 730.

In some embodiments, at least one conductor bundle (e.g., electrical conductor bundle 750a) of the plurality of electrical conductor bundles 740 may include an electrical conductor that has a diameter of approximately 1.15 millimeters. Moreover, in some embodiments, in at least one conductor bundle of the plurality of electrical conductor bundles 740 a first layer may be wound around a compliant element with a first helical angle (e.g., 37 degrees), and a second layer may be wound around the compliant element with a second helical angle (e.g., 35 degrees). In addition, the first layer may have a lay length of approximately 12 millimeters, and the second layer may have a lay length of approximately 23 millimeters.

Moreover, the tether 700 may include first interstices 722 that may be similar in form to the first interstices 622, and the tether 700 may include second interstices 724 that may be similar in form to the second interstices 624. In some embodiments, the first interstices 722 may be smaller in size than the first interstices 622 based at least in part on the cross-section shape of the strength members of the plurality of strength members 730. Moreover, in some embodiments, the second interstices 724 may be smaller in size than the second interstices 624 based at least in part on the cross-section shape of the strength members of the plurality of strength members 730. Further, in some embodiments, the tether 700 may further include a fill material (not shown) that fills the first interstices 722 and/or the second interstices 724 similar to fill material 526. Further still, the tether 700 may further include fiber optic cable, coaxial conductor, and/or sensor (not shown) similar to the fiber optic cable, coaxial conductor, or sensor 516. Moreover, the tether 700 may further include a mylar tape layer (not shown) and/or lightning shield (not shown) similar to tether 500.

In some implementations, a tether may include multiple groups of strength members that include different non-circular cross-section shapes. Beneficially, multiple groups of strength members that include different non-circular cross-section shapes may improve stability in bending of the strength members and/or tether.

Figure 8:
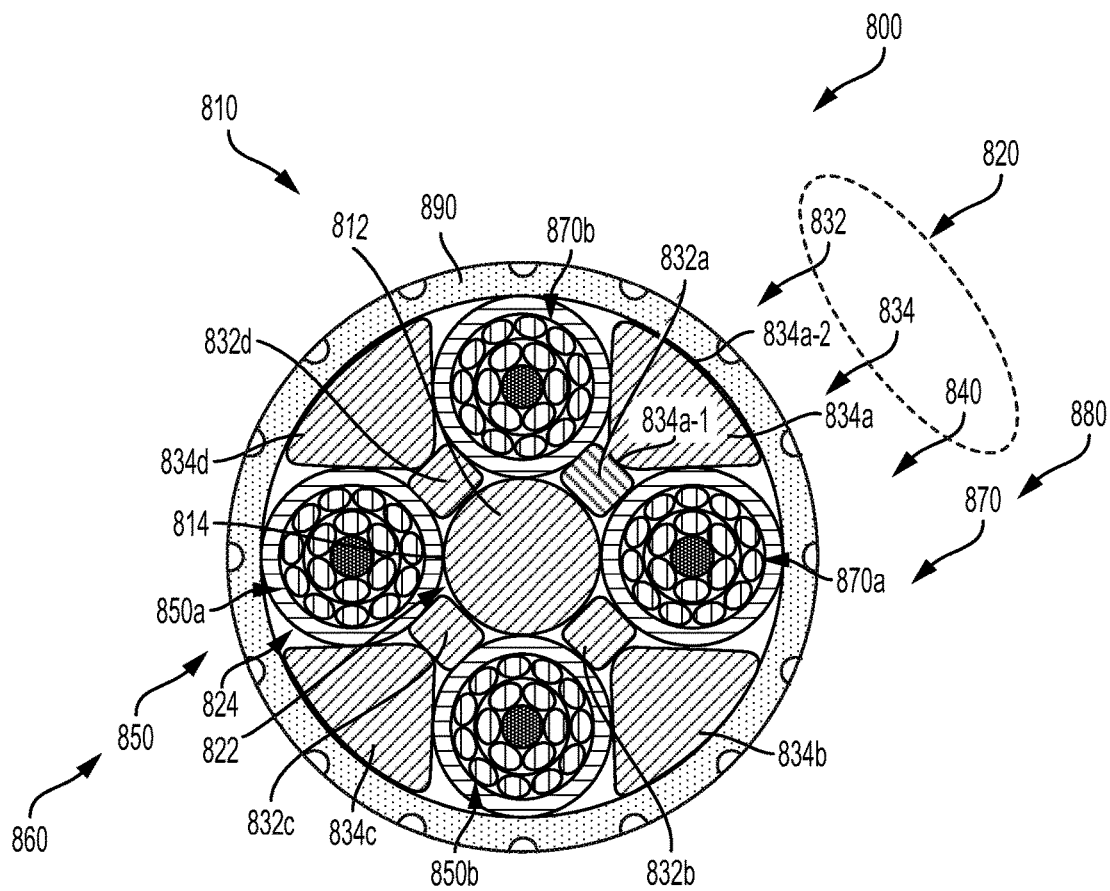
FIG. 8 depicts a tether, according to an example embodiment.

FIG. 8 depicts a tether 800, according to an example embodiment. The tether 120 and/or the tether 220 may take the form of or be similar in form to the tether 800. The tether 800 may include a core 810, a hybrid layer 820 (including elements 832, 834, and 840 described below) surrounding the core 810, and a jacket 890. The core 810 may include an axial rod 812.

The core 810 may be of the same configuration and function in a similar manner as the core 510 and/or the core 710, the axial rod 812 may be of the same configuration and function in a similar manner as the axial rod 512 and/or the axial rod 712, and the jacket 890 may be of the same configuration and function in a similar manner as jacket 590. The tether 800 may have a similar diameter and/or density as the tether 500 or tether 700.

The hybrid layer 820 may include a plurality of first strength members 832, a plurality of second strength members 834, and a plurality of electrical conductor bundles 840 (including elements 850 and 870 described below). As shown in FIG. 8, the plurality of first strength members 832 may be located around the core 810, the plurality of second strength members 834 may be located around the plurality of first strength members 832, and the plurality of electrical conductor bundles 840 may be located around the core 810. The plurality of first strength members 832, the plurality of second strength members 834, and the plurality of electrical conductor bundles 840 may be wound around the core 810 in a similar way as the plurality of strength members 530 and the plurality of electrical conductor bundles 540 are wound around the core.

The plurality of first strength members 832 and the plurality of second strength members 834 may function in a similar way as the plurality of strength members 530. In some embodiments, the plurality of first strength members 832 may include four strength members 832a-d. However, in other embodiments, the plurality of first strength members 832 may include more or less than four first strength members. Moreover, in some embodiments, each first strength member of the plurality of first strength members 832 may be located around a respective portion of the core 810, and each first strength member of the plurality of first strength members 832 is spaced apart from two other first strength members of the plurality of first strength members 832 by about 90 degrees along a circumference of the core 810.

In some embodiments, the first strength member 832a may include any of the materials of the first strength member 530a. For instance, in some embodiments, the first strength member 832a may comprise carbon fiber. Moreover, in some embodiments, the first strength member 832a may have the same flexural modulus as the first strength member 530a. Further, in some embodiments, the first strength member 832a may have a similar bend diameter as the first strength member 530a or strength member 730a.

As shown in FIG. 8, the first strength member 832a may include a non-circular cross-section shape. For example, the cross-section shape of the first strength member 832a may be rectangular. In some embodiments, the first strength members 832b-d may each have the same material, same flexural modulus, same bend diameter, and/or same cross-section shape as the first strength member 832a. With this arrangement, each first strength member of the plurality of first strength members 832 may include a non-circular cross-section shape. However, in other embodiments, at least two first strength members of the plurality of first strength members 832 may have different materials, flexural moduli, bend diameters, and/or cross-section shapes.

Moreover, in some embodiments, the plurality of second strength members 834 may include four strength members 834a-d. However, in other embodiments, the plurality of second strength members 834 may include more or less than four second strength members. Further, in some embodiments, each second strength member of the plurality of second strength members 834 may be located around a respective first strength member. With this arrangement, each second strength member of the plurality of second strength members 834 is spaced apart from two other second strength members of the plurality of second strength members 834 by about 90 degrees along the circumference of the core 810.

In some embodiments, the second strength member 834a may include any of the materials of the first strength member 832a. For instance, in some embodiments, the second strength member 834a may comprise carbon fiber. Moreover, in some embodiments, the second strength member 834a may have the same flexural modulus and/or the same bend diameter as the first strength member 832a.

As shown in FIG. 8, the second strength member 834a may include a non-circular cross-section shape. For example, the cross-section shape of the second strength member 834a may be triangular. In some embodiments, the cross-section shape of the second strength member 834a may include an inner portion 834a-1 and an outer portion 834a-2. The inner portion 834a-1 may contact the first strength member 832a, and the outer portion 834a-2 may contact the jacket 890. Moreover, in some embodiments, the outer portion 834a-2 may be wider than the inner portion 834a-1. Further, in some embodiments, the first strength member 832a may be wider than the inner portion 834a-1.

In some embodiments, the second strength members 834b-d may each have the same material, same flexural modulus, same bend diameter, and/or same cross-section shape as the second strength member 834a. With this arrangement, each second strength member of the plurality of second strength members 834 may include a non-circular cross-section shape. However, in other embodiments, at least two second strength members of the plurality of second strength members 834 may have different materials, flexural moduli, bend diameters, and/or cross-section shapes.

The plurality of electrical conductor bundles 840 may be similar in form to the plurality of electrical conductor bundles 640 and/or the plurality of electrical conductor bundles 740. Accordingly, components in FIG. 8 similar to those in FIGS. 6 and 7 may be of the same configuration and function in a similar manner. For instance, in some embodiments, each electrical conductor bundle of the plurality of electrical conductor bundles 840 may include a circular cross-section shape.

As shown in FIG. 8, the plurality of electrical conductor bundles 840 may include a first group of electrical conductor bundles 850 including elements 850a and 850b) defining a first electrical path 860, and a second group of electrical conductor bundles 870 including elements 870a and 870b) defining a second electrical path 880 that is different than the first electrical path 860. The first group of electrical conductor bundles 850 may be located around a first half of a circumference 814 of the core 810, and the second group of electrical conductor bundles 870 may be located around a second half of the circumference 814 of the core 810. Moreover, as shown in FIG. 8, each electrical conductor bundle of the plurality of electrical conductor bundles 840 may be located between two first strength members of the plurality of first strength members 832 and two second strength members of the plurality of second strength members 834.

Moreover, as shown in FIG. 8, the jacket 890 may surround the plurality of second strength members 834 and the plurality of electrical conductor bundles 840. Further, in some embodiments, the hybrid layer 820 may surround the core 810, such that first interstices 822 are located between adjacent components of the hybrid layer 820 (e.g., first strength members or electrical conductor bundles) and the core 810, and second interstices 824 are located between other adjacent components of the hybrid layer 820 (e.g., second strength members or electrical conductor bundles) and the jacket 890. The first interstices 822 may have a similar configuration and function in a similar manner as the first interstices 622, and the second interstices 824 may have a similar configuration and function in a similar manner as the second interstices 624. In some embodiments, the first interstices 822 may be smaller in size than the first interstices 622 based at least in part on the cross-section shape of the first strength members of the plurality of first strength members 832 and the cross-section shape of the second strength members of the plurality of second strength members 834. Moreover, in some embodiments, the second interstices 824 may be smaller in size than the second interstices 624 based at least in part on the cross-section shape of the first strength members of the plurality of first strength members 832 and the cross-section shape of the second strength members of the plurality of second strength members 834.

In addition, in some embodiments, the tether 800 may further include a fill material (not shown) that fills the first interstices 822 and/or the second interstices 824 similar to fill material 526. Further, the tether 800 may further include a fiber optic cable, coaxial conductor, or sensor (not shown) similar to the fiber optic cable, coaxial conductor, or sensor 516. Further still, the tether 800 may further include a mylar tape layer (not shown) and/or lightning shield (not shown) similar to tether 500.

In some implementations, a tether may include strength members that include a non-circular cross-section shape and electrical conductor bundles that include a non-circular cross-section shape. Beneficially, strength members and electrical conductor bundles that include non-circular cross-section shapes may improve packing of the tether.

Figure 9:
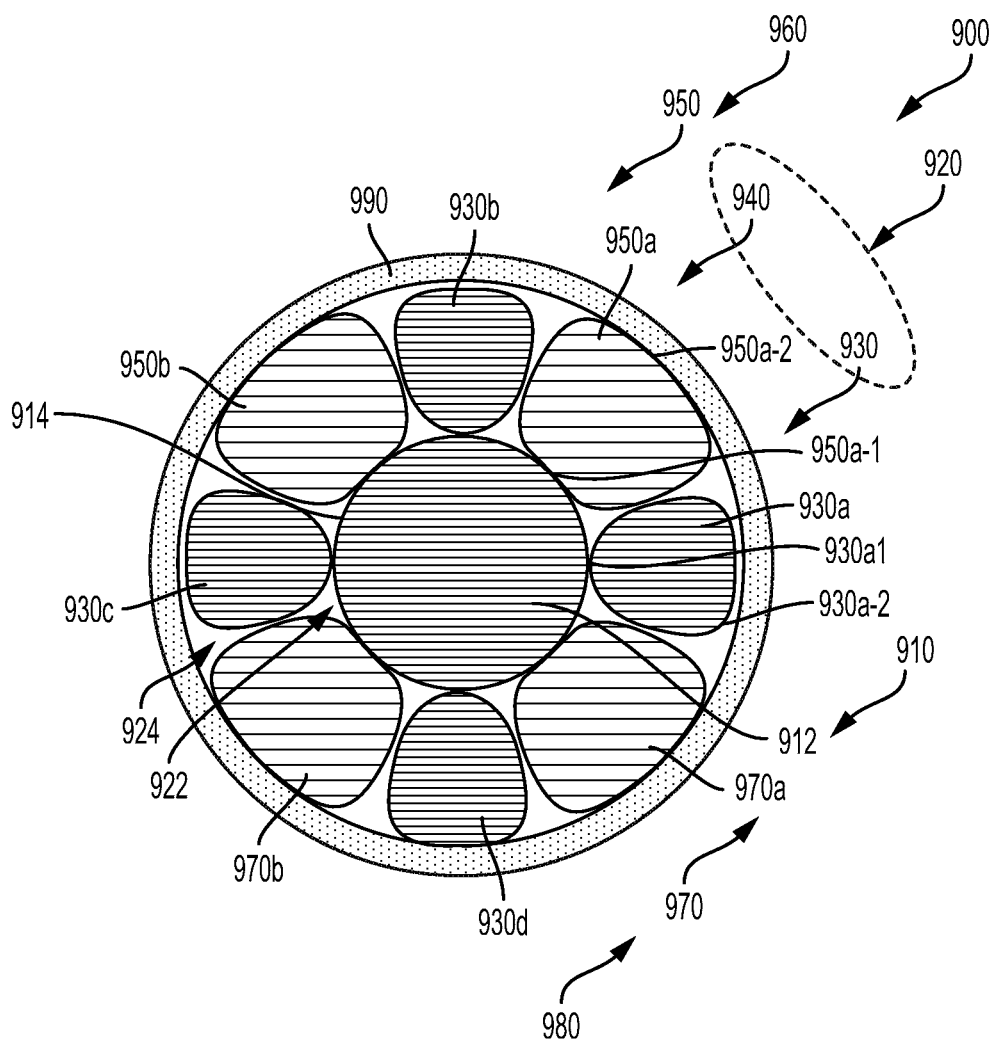
FIG. 9 depicts a tether, according to an example embodiment.

FIG. 9 depicts a tether 900, according to an example embodiment. The tether 120 and/or tether 220 may take the form of or be similar in form to the tether 900. The tether 900 may include a core 910, a hybrid layer 920 (including elements 930 and 940 described below) surrounding the core 910, and a jacket 990 surrounding the hybrid layer 920. The core 910 may include an axial rod 912.

The core 910 may be of the same configuration and function in a similar manner as the core 510 and/or the core 710, the axial rod 912 may be of the same configuration and function in a similar manner as the axial rod 512 and/or the axial rod 712, and the jacket 990 may be of the same configuration and function in a similar manner as jacket 590. The tether 900 may have a similar diameter and/or density as the tether 500 or tether 700.

The hybrid layer 920 may include a plurality of strength members 930 and a plurality of electrical conductor bundles 940 (including elements 950 and 970 described below) surrounding the core 910. The plurality of strength members 930 and the plurality electrical conductor bundles 940 may be wound around the core 910 in the same or similar way as the plurality of strength members 530 and the plurality of electrical conductor bundles 540 are wound around the core 510.

In some embodiments, the plurality of electrical conductor bundles 940 may include a first group of electrical conductor bundles 950 that defines a first electrical path 960, and a second group of electrical conductor bundles 970 that defines a second electrical path 980 that is different than the first electrical path 960. Moreover, in some embodiments, the first group of electrical conductor bundles 950 may include two electrical conductor bundles 950a-b and may be located around a first half of a circumference 914 of the core 910. Further, in some embodiments, the second group of electrical conductor bundles 970 may include two electrical conductor bundles 970a-b and may be located around a second half of the circumference 914 of the core 910.

Components in FIG. 9 similar to FIG. 6 may have the same or similar configuration and function in a similar manner. For example, the plurality of strength members 930 may have a similar configuration as the plurality of strength members 630, except that each strength member of the plurality of strength members 930 may include a non-circular cross-section shape. For instance, in some embodiments, the cross-section shape of strength member 930a may take the form of a wedge.

In some embodiments, the cross-section shape of the strength member 930a may include an inner portion 930a-1 and an outer portion 930a-2. The inner portion 930a-1 may contact the core 910, and the outer portion 930a-2 may contact the jacket 990. Moreover, in some embodiments, the outer portion 930a-2 may be wider than the inner portion 930a-1. In some embodiments, strength members 930b-d may have the same cross-section shape as the strength member 930a. However, in other embodiments, at least two strength members of the plurality of strength members 930 may have different non-circular cross-section shapes.

As another example, the plurality of electrical conductor bundles 940 may have a similar configuration as the plurality of electrical conductor bundles 640, except that each electrical conductor bundle of the plurality of electrical conductor bundles 940 may include a non-circular cross-section shape. For instance, in some embodiments, the cross-section shape of electrical conductor bundle 950a may take the form of a wedge.

In some embodiments, the cross-section shape of the electrical conductor bundle 950a may include an inner portion 950a-1 and an outer portion 950a-2. The inner portion 950a-1 may contact the core 910, and the outer portion 950a-2 may contact the jacket 990. Moreover, in some embodiments, the outer portion 950a-2 may be wider than the inner portion 950a-1. In some embodiments, electrical conductor bundles 950b d 950b and 970a-b may have the same cross-section shape as the electrical conductor bundle 950a. However, in other embodiments, at least two electrical conductor bundles of the plurality of electrical conductor bundles 940 may have different non-circular cross-section shapes.

Moreover, in some embodiments, the electrical conductor bundle 950a may include a compliant element, a plurality of electrical conducting elements wound around the compliant element, and an insulating layer surrounding the plurality of electrical conducting elements. The compliant element may have the same configuration and function in a similar manner as the compliant element 552a, the plurality of electrical conducting elements may have the same configuration and function in a similar manner as the plurality of electrical conducting elements 554a, and the insulating layer may have the same configuration and function in a similar manner as the insulating layer 558a. Further, in some embodiments, the non-circular cross-section shape of an electrical conductor bundle of the plurality of electrical conductor bundles 940 may be based at least in part on the shape of the electrical conducting elements and/or the winding of the plurality of electrical conducting elements are wound around the compliant element. Further still, in some embodiments, the non-circular cross-section shape of the electrical conductor bundle may be based at least in part on compacting the plurality of electrical conducting elements during fabrication of the electrical conductor bundle. In some such embodiments, the plurality of electrical conducting elements may be compacted before the insulating layer is formed around the plurality of electrical conducting elements.

Moreover, as shown in FIG. 9, the cross-section shape of electrical conductor bundle 950a is larger than the cross-section shape of the strength member 930a (e.g., outer portion 950a-2 is wider than outer portion 930a-2 and/or inner portion 950a-1 is wider than inner portion 930a-1). However, in some embodiments, the cross-section shape of electrical conductor bundle 950a may be similar in size to the cross-section shape of the strength member 930a.

In addition, in some embodiments, the tether 900 may further include a fill material (not shown) that fills the first interstices 922 and/or the second interstices 924 similar to fill material 526. Further, the tether 900 may further include a fiber optic cable, coaxial conductor, or sensor (not shown) similar to the fiber optic cable, coaxial conductor, or sensor 516. Further still, the tether 900 may further include a mylar tape layer (not shown) and/or lightning shield (not shown) similar to tether 500.

Although the tethers described above include a hybrid layer that comprises one layer, in other examples, a tether may include a hybrid layer that comprises two or more layers.

Figure 10:
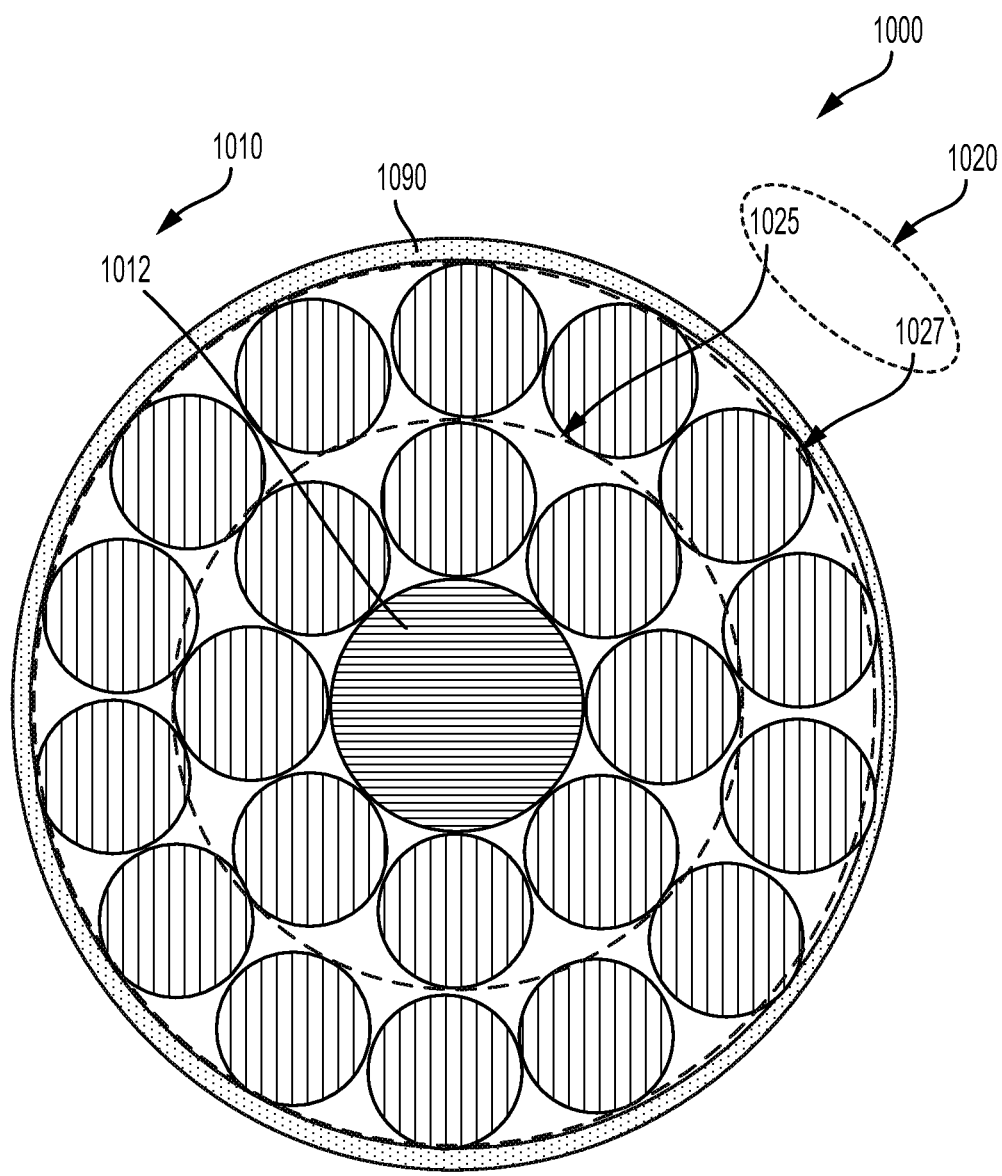
FIG. 10 depicts a tether, according to an example embodiment.

FIG. 10 depicts a tether 1000, according to an example embodiment. The tether 120 and/or the tether 220 may take the form of or be similar in form to the tether 1000. The tether 1000 may include a core 1010, a hybrid layer 1020 (including elements 1025 and 1027 described below) surrounding the core 1010, and a jacket 1090 surrounding the hybrid layer 1020. The core may include an axial rod 1012.

The core 1010 may be of the same configuration and function in a similar manner as the core 510 and/or the core 710, the axial rod 1012 may be of the same configuration and function in a similar manner as the axial rod 512 and/or the axial rod 712, and the jacket 1090 may be of the same configuration and function in a similar manner as jacket 590.

The hybrid layer 1020 may include a first layer 1025 and a second layer 1027. In some embodiments, the first layer 1025 may include a plurality of strength members and/or a plurality of electrical conductor bundles, and the second layer 1027 may include a plurality of second strength members and/or a plurality of second electrical conductor bundles.

In one implementation, the first layer 1025 may include a plurality of strength members and plurality of electrical conductor bundles, and the second layer 1027 may include a plurality of second strength members and a plurality of second electrical conductor bundles.

The plurality of strength members may take the form of or be similar in form to the plurality of strength members 530 or the plurality of strength members 730, and the plurality of electrical conductor bundles may take the form of or be similar in form to the plurality of electrical conductor bundles 540 or the plurality of electrical conductor bundles 940. In addition, the plurality of second strength members may take the form of or be similar in form to the plurality of strength members, and the plurality of second electrical conductor bundles may take the form of or be similar in form to the plurality of electrical conductor bundles. For instance, each second electrical conductor bundle of the plurality of second electrical conductor bundles may include a compliant element, a plurality of electrical conducting elements surrounding the compliant element, and an insulating layer surrounding the plurality of electrical conducting elements.

In some embodiments, the number of second strength members and number of second electrical conductor bundles in the second layer 1027 may be the same as or different than the number of strength members and number of electrical conductor bundles in the first layer 1025.

In addition, the materials, diameters, cross-section shapes, flexural modulus, and/or bend diameter of the second strength members may be the same as or different than the materials, diameters, cross-section shapes, flexural modulus and/or bend diameter of strength members. Similarly, the materials, thicknesses, and/or cross-section shapes of the second electrical conductor bundles may be the same as or different than the materials, thicknesses, and/or cross-section shapes of the electrical conductor bundles.

In another implementation, the first layer 1025 may include a plurality of strength members, and the second layer 1027 may include a plurality of second strength members and a plurality of electrical conductor bundles. The plurality of strength members may take the form of or be similar in form to the plurality of strength members 530 or the plurality of strength members 730. In addition, the plurality of second strength members may take the form of or be similar in form to the plurality of strength members, and the plurality of electrical conductor bundles may take the form of or be similar in form to the plurality of electrical conductor bundles 540 or the plurality of electrical conductor bundles 940. The first layer 1025 and second layer 1027 may have other combinations of strength members and electrical conductor bundles as well.

The hybrid layer 1020 may be wound around the core 1010 in the same or similar way as the hybrid layer 520 is wound around the core 510. In some embodiments, the first layer 1025 and the second layer 1027 may be wound around the core 1010 in the same direction, wound around the core 1010 with the same helical angle, and/or same amount of twist (e.g., fixed, planetary, or back twist compensated). However, in other embodiments, the first layer 1025 and the second layer 1027 may be would around the core 1010 in different directions, would around the core 1010 with different helical angles, have different lay lengths, and/or different amounts of twist.

In addition, in some embodiments, the hybrid layer 1020 may surround the core 1010, such that first interstices (not labeled in FIG. 10) are located between adjacent components and the core 1010, and second interstices (not labeled in FIG. 10) are located between adjacent components of the hybrid layer 1020 and the jacket 1090. The first and second interstices may be similar in form to the first interstices 522 and the second interstices 524, respectively. Further, in some embodiments, the tether 1000 may further include fill material (not shown) that fills the first interstices and/or the second interstices similar to fill material 526. Further still, in some embodiments, the tether 1000 may further include fiber optic cable, coaxial conductor, and/or sensor (not shown) similar to the fiber optic cable, coaxial conductor, or sensor 516. Moreover, the tether 1000 may further include a mylar tape layer and/or lightning shield (not shown) similar to tether 500.

In some implementations, components of the first layer 1025 and the second layer 1027 may be nested in ways that might not be illustrated in FIG. 10.

Although example tethers described above may be used in AWTs, in other examples, tethers described herein may be used for other applications, including overhead transmission, aerostats, subsea and marine applications, including offshore drilling and remotely operated underwater vehicles (ROVs), towing, mining, and/or bridges, among other possibilities.

III. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A tether comprising:
   a core;
   a hybrid layer surrounding the core, wherein the hybrid layer comprises:
      a plurality of strength members immediately adjacent to the core, and
      a plurality of electrical conductor bundles immediately adjacent to the core, wherein each electrical conductor bundle of the plurality of electrical conductor bundles comprises:
         a non-metallic solid compliant element,
         a plurality of electrical conducting elements surrounding the non-metallic solid compliant element, and
         an insulating layer surrounding the plurality of electrical conducting elements; and
   a jacket surrounding the hybrid layer.

2. The tether of claim 1, wherein the plurality of strength members comprises a first strength member and a second strength member, wherein the first strength member is spaced apart from the second strength member by about 180 degrees along a circumference of the core.

3. The tether of claim 1, wherein the plurality of electrical conductor bundles comprises:
   a first group of electrical conductor bundles defining a first electrical path, wherein the first group of electrical conductor bundles is located around a first portion of the core, such that a cross-section of the first group of electrical conductor bundles defines a first arc along the first portion of the core; and
   a second group of electrical conductor bundles defining a second electrical path that is different than the first electrical path, wherein the second group of electrical conductor bundles is located around a second portion of the core, such that a cross-section of the second group of the electrical conductor bundles defines a second arc along the first second portion of the core,
   wherein the plurality of strength members comprises a first strength member and a second strength member, wherein the first group of electrical conductor bundles is located between the first strength member and the second strength member, and wherein the second group of electrical conductor bundles is located between the first strength member and the second strength member.

4. The tether of claim 3, wherein the first group of electrical conductor bundles is configured to carry a first phase of electrical power, and wherein the second group of electrical conductor bundles is configured to carry a second phase of electrical power that is different from the first phase of electrical power.

5. The tether of claim 3, wherein the first group of electrical conductor bundles is configured to operate at a first potential, and wherein the second group of electrical conductor bundles is configured to operate at a second potential that is different from the first potential.

6. The tether of claim 1, wherein the plurality of strength members comprises four strength members, wherein each strength member of the plurality of strength members is located around a respective portion of the core, and wherein each strength member of the plurality of strength members is spaced apart from two other strength members of the four strength members by about 90 degrees along a circumference of the core.

7. The tether of claim 1, wherein the plurality of electrical conductor bundles comprises:
   a first group of two electrical conductor bundles defining a first electrical path, wherein the first group of two electrical conductor bundles is located around a first half of a circumference of the core, and
   a second group of two electrical conductor bundles defining a second electrical path that is different from the first electrical path, wherein the second group of two electrical conductor bundles is located around a second half of the circumference of the core,
   wherein the plurality of strength members comprises four strength members, and wherein each electrical conductor bundle of the plurality of electrical conductor bundles is located between two strength members of the plurality of strength members.

8. The tether of claim 1, wherein each strength member of the plurality of strength members comprises a non-circular cross-section shape.

9. The tether of claim 1, wherein each electrical conductor bundle of the plurality of electrical conductor bundles comprises a non-circular cross-section shape.

10. The tether of claim 1, wherein the core or at least one strength member of plurality of strength members comprises an abrasion resistant layer.

11. The tether of claim 1 further comprising at least one fiber optic cable, coaxial conductor, or sensor located in first interstitial spaces between adjacent strength members or electrical conductor bundles and the core, or second interstitial spaces between adjacent strength members or electrical conductor bundles and the jacket.

12. The tether of claim 1, wherein the core or at least one strength member of the plurality of strength members comprises a fiber optic cable, coaxial conductor, or sensor.

13. The tether of claim 1 further comprising a fill material located in (i) first interstices between adjacent strength members or electrical conductor bundles and the core and (ii) second interstices between adjacent strength members or electrical conductor bundles and the jacket.

14. The tether of claim 1 further comprising:
   a plurality of second strength elements; and
   a plurality of second electrical conductor bundles, wherein each second electrical conductor bundle of the plurality of second electrical conductor bundles comprises:
      a compliant element,
      a plurality of electrical conducting elements surrounding the compliant element, and
      an insulating layer surrounding the plurality of electrical conducting elements.

15. The tether of claim 1, wherein the jacket comprises an outer surface that comprises a plurality of drag-affecting surface features.

16. A tether comprising:
   a core;
   a hybrid layer surrounding the core, wherein the hybrid layer comprises:
      a first strength member immediately adjacent to the core,
      a second strength member immediately adjacent to the core, and a plurality of electrical conductor bundles immediately adjacent to the core, wherein each electrical conductor bundle of the plurality of electrical conductor bundles comprises: a compliant element, a plurality of electrical conducting elements wound around the compliant element, and an insulating layer surrounding the plurality of electrical conducting elements, wherein the plurality of electrical conductor bundles comprises:

a first group of electrical conductor bundles defining a first electrical path, wherein the first group of electrical conductor bundles is located around a first portion of the core, such that a cross-section of the first group of electrical conductor bundles defines a first arc along the first portion of the core, and a second group of electrical conductor bundles defining a second electrical path that is different than the first electrical path, wherein the second group of electrical conductor bundles is located around a second portion of the core, such that a cross-section of the second group of the electrical conductor bundles defines a second arc along the second portion of the core, wherein the first group of electrical conductor bundles is located between the first strength member and the second strength member, and wherein the second group of electrical conductor bundles is located between the first strength member and the second strength member; and a jacket surrounding the hybrid layer.

17. The tether of claim 16, wherein the plurality of electrical conductor bundles comprises six electrical conductor bundles.

18. A tether comprising:
a core;
a hybrid layer surrounding the core, wherein the hybrid layer comprises:
a plurality of strength members, wherein each strength member of the plurality of strength members comprises a wedge cross-section shape;
a plurality of electrical conductor bundles, wherein each electrical conductor bundle of the plurality of electrical conductor bundles comprises a circular cross-section shape, wherein each electrical conductor bundle of the plurality of electrical conductor bundles comprises: a compliant element, a plurality of electrical conducting elements wound around the compliant element, and an insulating layer surrounding the plurality of electrical conducting elements, wherein the plurality of electrical conductor bundles comprises:
a first group of electrical conductor bundles defining a first electrical path, wherein the first group of electrical conductor bundles is located around a first half of a circumference of the core, and
a second group of electrical conductor bundles defining a second electrical path that is different than the first electrical path, wherein the second group of electrical conductor bundles is located around a second half of the circumference of the core, and
wherein each electrical conductor bundle of the plurality of electrical conductor bundles is located between two strength members of the plurality of strength members; and
a jacket surrounding the hybrid layer.

19. The tether of claim 18, wherein the first group of electrical conductor bundles comprises two electrical conductor bundles, and wherein the second group of electrical conductor bundles comprises two electrical conductor bundles.

20. A tether comprising:
a core;
a hybrid layer surrounding the core, wherein the hybrid layer comprises:
a plurality of first strength members located around the core, wherein each first strength member of the plurality of first strength members comprises a rectangular cross-section shape,
a plurality of second strength members located around the plurality of first strength members, wherein each second strength member of the plurality second strength members comprises a triangular cross-section shape, and
a plurality of electrical conductor bundles located around the core, wherein each electrical conductor bundle of the plurality of electrical conductor bundles comprises a circular cross-section shape, wherein each electrical conductor bundle of the plurality of electrical conductor bundles comprises: a compliant element, a plurality of electrical conducting elements wound around the compliant element, and an insulating layer surrounding the plurality of electrical conducting elements, wherein the plurality of electrical conductor bundles comprises:
a first group of electrical conductor bundles defining a first electrical path, wherein the first group of electrical conductor bundles is located around a first half of a circumference of the core, and
a second group of electrical conductor bundles defining a second electrical path that is different than the first electrical path, wherein the second group of electrical conductor bundles is located around a second half of the circumference of the core, and
wherein each electrical conductor bundle of the plurality of electrical conductor bundles is located between two first strength members of the plurality of first strength members and two second strength members of the plurality of second strength members; and
a jacket surrounding the plurality of second strength members and the plurality of electrical conductor bundles.

* * * * *